US008538886B1

(12) United States Patent
Iu et al.

(10) Patent No.: US 8,538,886 B1
(45) Date of Patent: Sep. 17, 2013

(54) WATERMARKING SYSTEM AND METHODOLOGY FOR DIGITAL MULTIMEDIA CONTENT

(75) Inventors: Siu-Leong Iu, San Jose, CA (US); Malcom Davis, Bellevue, WA (US); Hui Luo, Marlboro, NJ (US); Yun-Ting Lin, Ossining, NY (US); Guillaume Mercier, McLean, VA (US); Kobad Bugwadia, San Jose, CA (US)

(73) Assignee: Google Inc., Mountain View, CA (US)

( * ) Notice: Subject to any disclaimer, the term of this patent is extended or adjusted under 35 U.S.C. 154(b) by 972 days.

(21) Appl. No.: 09/763,917

(22) PCT Filed: Aug. 31, 1999

(86) PCT No.: PCT/US99/19723
§ 371 (c)(1),
(2), (4) Date: Jul. 3, 2011

(87) PCT Pub. No.: WO00/13136
PCT Pub. Date: Mar. 9, 2000

Related U.S. Application Data

(60) Provisional application No. 60/098,687, filed on Aug. 31, 1998.

(51) Int. Cl.
*G06F 17/00* (2006.01)
(52) U.S. Cl.
USPC .............. 705/51; 382/100; 382/232; 380/252
(58) Field of Classification Search
USPC ........................................ 713/164; 705/51, 1
See application file for complete search history.

(56) References Cited

U.S. PATENT DOCUMENTS

| 4,644,422 | A | * | 2/1987 | Bedini .............................. 360/60 |
|---|---|---|---|---|
| 5,182,771 | A | * | 1/1993 | Munich et al. ................ 380/204 |
| 5,465,308 | A | | 11/1995 | Hutcheson et al. |
| 5,574,787 | A | | 11/1996 | Ryan |
| 5,765,176 | A | | 6/1998 | Bloomberg |
| 5,943,422 | A | * | 8/1999 | Van Wie et al. ................. 705/54 |
| 5,959,717 | A | * | 9/1999 | Chaum ........................... 352/40 |
| 6,182,218 | B1 | * | 1/2001 | Saito ............................. 713/176 |
| 6,208,746 | B1 | * | 3/2001 | Musgrave ..................... 382/100 |
| 6,320,965 | B1 | * | 11/2001 | Levine ........................... 380/34 |
| 6,363,159 | B1 | * | 3/2002 | Rhoads ........................ 382/100 |
| 6,424,715 | B1 | * | 7/2002 | Saito ............................. 380/201 |
| 6,529,600 | B1 | * | 3/2003 | Epstein et al. ................ 380/252 |
| 6,809,792 | B1 | * | 10/2004 | Tehranchi et al. .............. 352/85 |

OTHER PUBLICATIONS

"Wavelets and Subband Coding", M. Vetterli et al., 1995, chapters 4-7.
"The World According to Wavelets", Hubbard, 1996, chapters 4-5.
"A Review of Watermarking and the Importance of Perceptual Modeling", I. Cox et al., Proc. of Electronics Imaging '97, Feb. 1997.
"Towards Robust and Hidden Image Copyright Labeling", E. Koch et al., Proc. of 1995 IEEE Workshop on Nonlinear Signal and Image Processing.

* cited by examiner

*Primary Examiner* — Calvin L Hewitt, II
*Assistant Examiner* — John M Winter
(74) *Attorney, Agent, or Firm* — Young Basile Hanlon & MacFarlane P.C.

(57) ABSTRACT

An open digital watermark system and methodology having various features for unifying watermark production and processing among diverse user multimedia terminals (112), such as set top box, that may be OPIMA compliant. In accordance with specific aspects, intentional image warping is employed to combat pirating, the analog video channel used to download programming, packet signature implemented for watermark insertion by pixel replacement and use of the data stream made to reduce local data processing and storage.

28 Claims, 19 Drawing Sheets

(a)

(b)

(c)

(d)

(a)

(b)

(c)

01121110

(d)

WATERMARKING SYSTEM AND METHODOLOGY FOR DIGITAL MULTIMEDIA CONTENT

The present application is a 35 U.S.C. §371 application that claims priority from U.S. provisional patent application No. 60/098,687 entitled "Watermarking System and Methodology For Digital Multimedia Content" and filed on Aug. 31, 1998.

TECHNICAL FIELD

This invention relates generally to data protection, and more particularly to aspects of a novel digital watermark system and methodology for multimedia content, such as audio, video, text, still images, computer graphics, and software.

BACKGROUND ART

A watermark is an imperceptible or at least difficult to perceive signal embedded into multimedia content such as audio, video, text, still images, computer graphics, or software. The watermark conveys some useful information without disturbing or degrading the presentation of the content in a way that is noticeable or objectionable. Watermarks have been used for the purpose of protecting the property rights of content providers, e.g., by helping to identify the rightful owner of the content. In this case, it should be possible reliably to retrieve the watermark even from content that has been significantly modified or degraded by various causes. The watermark should be resistant to intentional or unintentional removal, counterfeiting, or other tampering without substantial degradation to the content, significantly reducing its commercial value. A watermark should survive innocent processing like compression, decompression, analog to digital and digital to analog conversion, and format conversion (e.g., converting video from NTSC to PAL). The watermark should defy a deliberate attack by a pirate using common signal processing operations. In addition, it must be difficult to counterfeit a watermark; otherwise, watermarks might not be useful, for example, in resolving multiple claims of ownership.

Watermarking technology is divided into three broad categories with different objectives, namely, tracing, copy protection and proof of ownership (copyright protection). Tracing identifies users that sell or give away illegal copies of protected content. Copy protection is implemented to prevent coping (at least, by compliant recorders) of content that contains a watermark denoting that the content should not be copied. Proof of ownership invalidates claims of ownership by anyone other than the legitimate owner of a copyrighted work.

To help trace the illegal redistribution of multimedia content, a watermark can be inserted into the content that contains information, which identifies the source of the copy. This watermark can include information such as the user identification number (e.g., from a smartcard), the serial number of the terminal, the serial number of the content, and the date and time the content was presented or copied. Since the watermark is different for every terminal and every user of the terminal, it must be inserted by the terminal and similar devices (at least, for broadcasted content such as pay-per-view and video on demand). This type of watermark may be recovered off-line by the content provider, service provider, or law enforcement officials.

To provide proof of ownership, the content provider or service provider embeds a watermark into the multimedia content prior to public distribution. The watermark may be embedded into uncompressed or compressed versions of the content (or both). A properly constructed watermark unambiguously identifies the owner of the content. Later, if multiple claims of ownership need to be resolved, only the rightful owner of the content can recover the watermark from each copy of the content claimed to be an original.

Currently proposed watermarking techniques are proprietary and mutually incompatible. A standardized and unified approach would benefit the consumer by allowing interoperability among different content providers, service providers, and terminal equipment. Consistent and dependable methods for content protection also benefit the consumer since it gives content providers and service providers more incentive to provide content. This invention attempts to reap these benefits by placing a wide variety of watermarking techniques into a unified and standardized framework that is incorporated into a terminal compliant. for example, with the currently proposed Open Platform Initiative for Multimedia Access (OPIMA), the framework for which is described in the called for proposals by the OPIMA, dated Jul. 24, 1998. In accord with the OPIMA philosophy, the proposed watermark standard is open and expandable. Standardization and openness are required because proprietary systems discourage the consumer due to a lack of interoperability. For example, deploying a video recorder that will only record content containing a "copying is allowed" watermark is worthwhile only if it can retrieve watermarks inserted by playback devices produced by many manufacturers. In addition, standardization and openness ensure that compliant devices have at least the minimum capabilities required to support the necessary functionalities (including watermarking). Expandability is needed because experience clearly indicates that technology advances rapidly and, in particular, security technology does not remain secure for very long whereas consumer electronics devices may remain in service for more than a decade. Also, new types of content and new technologies, not yet imagined, must be secure and protected.

Application Ser. No. 09/092,898, filed on Jun. 8, 1998, assigned to the assignee of the present invention and incorporated herein by reference, describes a digital watermark system implementing novel "running marks" embedded into "message holes" in a bitstream bearing information, such as audio, video, still pictures, software, etc., for which there is a proprietary interest to be protected. The message holes are in locations in the bitstream, strategically positioned to be impossible or difficult to observe in a frame (when the bitstream comprises a video signal). In an MPEG environment, the message holes are macroblocks each capable of storing one or more carrier bits of data. The running marks are injected into the message hole locations of the bitstream at the time a medium, such as a DVD, is played. The data represented by the running marks identify the serial numbers of the player and DVD, and the time of play. This information is decoded by an enforcement institution that will play back the contents of an unauthorized copy of the DVD to extract the running marks to be used to trace to the copyist.

To make the extraction process more difficult, an unauthorized copyist (pirate) may combine video outputs from a number of video players when a copy is made, so that the running mark information associated with any one player will not be easily read unambiguously. The copending application describes methodology using code division multiple access coding (CDMA) to detect the running marks associated with each single player among running marks associated with all the players used. Each player in this methodology encodes its running mark data using a different low correlation waveform. The example described in the application implements a set of Hadmard-Walsh (HW) waveforms because they are mutually orthogonal and easily generated. During decoding by the institution to extract the running mark information, bits are recovered by performing correlation (inner products) between the received waveform and reference waveforms to decode the running marks and provide source-of-copying information. Since correlation among these waveforms is low, inner product processing extracts the running mark bits correctly in a field of received waveforms from multiple players. The waveform adopted by a player is selected randomly at runtime from a finite set waveforms, to avoid the situation, although rare, where a pirate may use multiple players having the same waveform to make a copy. To additionally make the waveforms more difficult for the pirate to determine, the described methodology includes waveform value scrambling and uses more than one waveform in a bitstream. To preserve the orthogonal property, and reduce the effect of burst error, the waveforms are permuted among different columns first and then among different rows. Storage of the CDMA waveform values (this may be incorporated in a separate security chip), even on a column basis, requires a considerable amount of memory. Placing the storage off chip is complicated, and security in that event is compromised.

Despite that the described system and methodology is an effective means to thwart piracy, an even greater level of security is preferred. No security methodology can be made absolutely immune from defeat by reverse engineering on the part of a committed pirate. However, it is desirable at least to maximize the amount of time it will require a pirate to invade security so that valuable proprietary material, such as a currently popular movie, is not misappropriated early in its commercial lifetime when it is most valuable.

It is also desirable to utilize the bandwidth of the running mark system, described in the copending application, more efficiently and with greater versatility, to enable the system more easily to accommodate changes in software programming and to simplify running mark housekeeping functions.

It is particularly desirable to formulate a variety of watermarking techniques into a unified and standardized framework that may be incorporated into, for example, an OPIMA compliant terminal.

DISCLOSURE OF THE INVENTION

The above and other objectives and advantages are achieved, at least in part, by a novel system and methodology for processing a video bitstream where multiple (N) copies have been combined by a pirate from N players, for making it difficult to extract the running mark data for any player. The invention is performed, in accord with one aspect, by altering the video image slightly using any of a variety of different mapping functions during encoding to warp the video image by a small amount. The mapping function may change from time to time, such as periodically, using small changes of pixel position on the screen, or sharper changes upon significant scene changes. In a preferred embodiment, each time a video is played, the player will select randomly among a finite number of mapping functions applied during encoding of the video bitstream.

Pixels thus are shifted in position and must be realigned to the original pixel positions in the reproduced video upon decoding so that the image will not appear distorted. A pirate will be able to perform the necessary realignment of pixels only by doing so for each legitimate copy combined to make an unauthorized master copy of a video. This work on the part of the pirate is made more difficult by the fact that the pirate will not have possession of the original. The position shift furthermore prevents the pirate from being able to remove the watermarks by discerning the corresponding correlation function by well known video techniques, such as taking the average or multiplexing among the N copies.

In accord with another aspect of the invention, watermark data, other data or software may be downloaded from a service provider by embedding the data or software in the analog channel of the video supplied by the provider to the user. This is in contrast with conventional systems sending data to the user during the non-active portions of a video signal, such as during the blanking interval of an NTSC waveform. The software may comprise programming for changing the functionality of equipment in the hardware platform at the user terminal, e.g., encryption implemented in the encoder of a player. Preferably, local error correction is performed on the received software, where no handshaking with the provider is carried out. The data in practice will be downloaded at a rate sufficiently high such that the image may be disturbed. However, in general, downloading will be relatively brief or performed while the television or monitor is not being used and may be intentionally blanked.

Another aspect of the invention is an alternative to storing a table of CDMA waveform values used for encoding the running mark data that is produced each time a DVD is played as described in the copending application. In accord with the invention, CDMA waveform values are carried, column by column, in the running mark pack within the video bitstream. Preferably, up to two columns of the CDMA waveform values are embedded in a running mark pack. During encoding, the incoming encrypted bitstream contains the original video data and running mark packs. The CDMA table column values are added by to the running mark pack by vectoring to the bottom end of a pack and storing upward. In the preferred embodiment a single column of values may be derived from bits of different columns of the CDMA table, for enhanced security. Flexibility is enhanced because the columns being carried by the running mark pack may be changed during play.

In another aspect of the invention, the data structure implemented in the MPEG bitstream of running mark system is comprised of a header followed by successive data regions. Between the header and first data region, and between successive data regions is an unused portion. A pointer from the header or from any data region to the next data region, jumping over the unused portion, enables the unused portion to be filled by future program expansion such as watermark insertion, encryption, etc.

In accord with yet another aspect, in which the bitstream containing video, audio and watermark data is in MPEG-2 packets, the particular packet to which watermark data is to be added by message hole replacement is uniquely identified. This is done, either by packet counting that is inherently unreliable in the presence of noise, or by packet numbering that is complicated and adds to overhead, or by signature. In the preferred embodiment, the signature of a packet is derived from the stream identification (stream_id) and presentation time stamp (PTS) of a packet, defined in the MPEG-2 standard for packetized elemental streams (PES). The stream_id, describing the type of packet, and PTS describing time interval within a packet for synchronization purposes, together form a signature that is usually capable of identifying the location of a particular bit within the bitstream. If a packet does not contain a PTS, the packet location in a bitstream is identified by offset from a previous packet having a PTS. Absolute location can be used to locate a packet when there is no available signature. To reduce ambiguities, and enhance robustness, more than one signature can be employed, or signature in combination with an absolute or relative address, may be implemented to identify a packet location.

In accord with still another aspect of the invention, to reduce the amount of re-encoding performed at the encoder, to maintain the packet length constant so as to prevent control buffer overflow/underflow, some of the re-encoding is performed at the service provider. This methodology reduces the amount of processing necessary at the player hardware.

BRIEF DESCRIPTION OF THE DRAWINGS

FIGS. 12(a)-(d) show exemplary scan patterns, wherein FIG. 12(a) represents the four horizontal rectangular scans (horizontal=1), FIG. 12(b) represents the four vertical rectangular scans (horizontal=0), FIG. 12(c) represents the four zigzag scans for horizontal=1, and FIG. 12(d) represents the four zigzag scans for horizontal=0, and wherein the circular dot denotes the first corner of a rectangle.

FIG. 13(a)-(d) represent chain coding, wherein FIG. 13(a) represents a sample coding scheme, FIG. 13(b) represents a contour segment, FIG. 13(c) is a chain-coded representation and FIG. 13(d) shows a contour segment code.

BEST MODE FOR PRACTICING THE INVENTION

Figure 1:
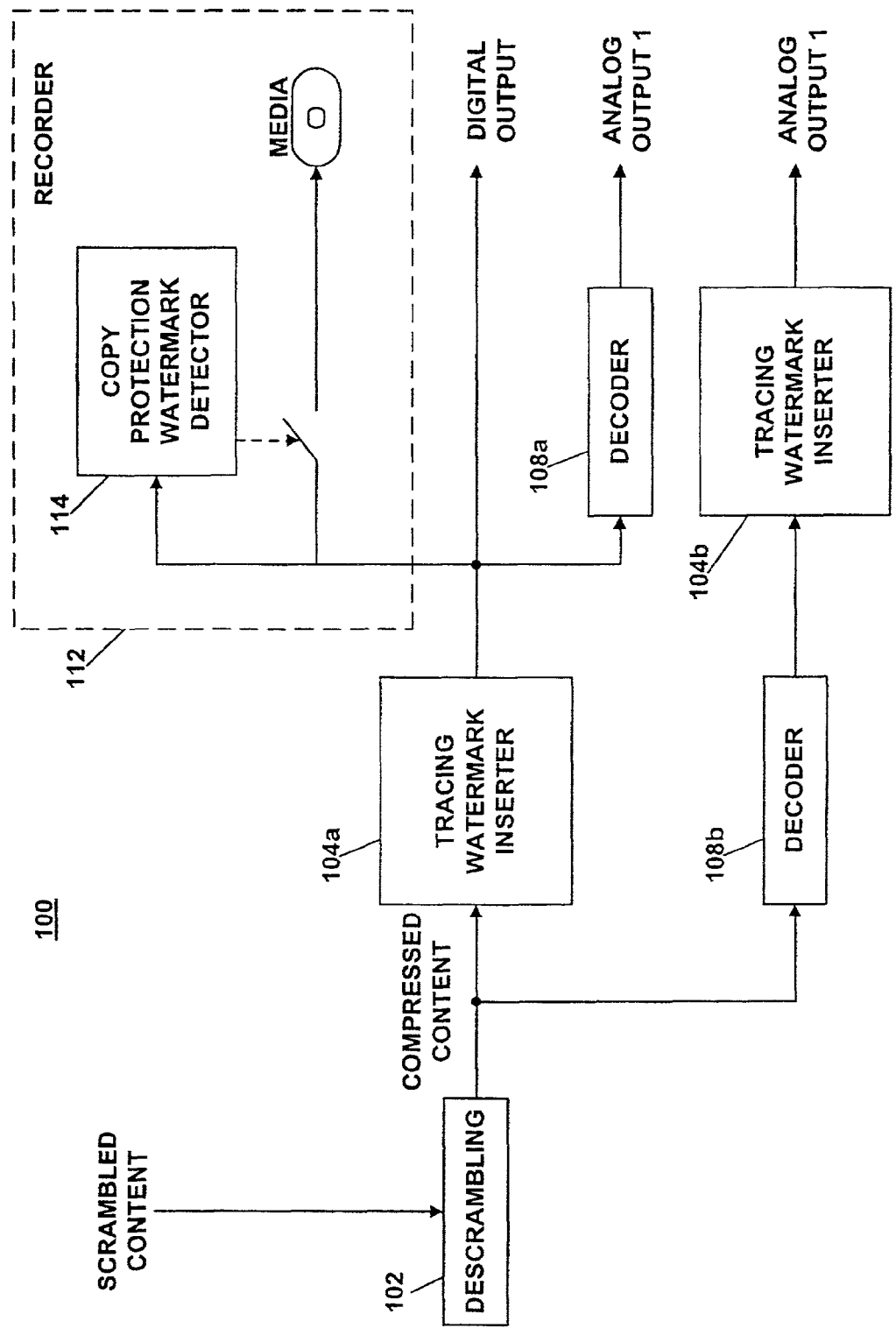
FIG. 1 is a high-level block diagram showing the hardware platform of a user terminal in which the invention is implemented.

Proposed image and video watermarking techniques can be divided into categories baed upon the domain in which they operate: spatial domain, or transform domain. Spatial domain techniques immerse the watermark into uncompressed video data, e.g., by directly modifying pixel values. The uncompressed video may be video that has not been compressed or video that has been obtained by decompressing a compressed video. Transform domain techniques compute a transformation (like the FFT, DCT, or wavelet transforms) of part of the video, insert the watermark by modifying the coefficient values, and compute the inverse transform to obtain the watermarked video.

The complexity of spatial domain techniques can be moderate. For example, suppose the watermark is a noise-like pseudo-random sequence that is added to the luminance pixel values comprising a video. A hardware implementation of a pseudo-random generator requires only a few gates and a software implementation is not computationally complex. Spatial domain techniques are not constrained by the MPEG bitstream format. For instance, it is possible to spread the watermark throughout the entire video if every pixel in every frame is modified. Of course, it is convenient to use spatial domain techniques only when the uncompressed video is available (before compression or after decompression). Otherwise, it would be necessary to decode the compressed bitstream, insert the watermark, and reencode the video, which is costly and time-consuming. It is likely that, for the next few years, many consumer electronics devices with digital video capabilities will not give the consumer access to the unencrypted MPEG bitstream. Instead, the video will be accessible as an analog video signal (e.g., composite or s-video). Watermarking techniques that operate in the spatial domain on uncompressed video can protect the video at these outputs and are viable for such devices.

Transform domain watermarking techniques often have high complexity. Usually, a DCT, FFT, or wavelet transform of an entire image and its inverse is computed. The computational burden is substantial. If the watermark needs to be added to an MPEG bitstream, decoding and reencoding also are required. Despite the high complexity, transform domain techniques are the most common approach to watermarking (at least, when computational complexity is not an issue). The relevance of these transforms, especially the DCT and wavelet, to human perception is a major reason for this popularity. Another reason is that these transforms are natural operating domains for spread spectrum techniques. The MPEG bitstream format does not impose any constraints in the transform domain. It is possible, however, for some transform domain techniques to take advantage of the 8×8 DCTs in the MPEG bitstream.

The method of Swanson, Zhu, and Tewfik is an interesting example of a transform domain technique. The (uncompressed) video to be watermarked is segmented into scenes. A 3D (x, y, and t) wavelet transform of each scene is computed. By computing the wavelet temporally as well as spatially, it is possible to spread the watermarks across a greater portion of the video. For instance, the watermark embedded in the lowest frequency wavelet coefficient exists throughout all frames in the scene. A model of the human visual system is used to assess how much each wavelet coefficient can be modified without introducing a noticeable degradation of the video. The model takes into account frequency masking and spatial masking effects. The watermark is embedded into the video by modifying the wavelet coefficients to the extent indicated by the model and computing the inverse wavelet transform.

The watermarking process is configured and controlled by a series of messages that are present in an auxiliary bit stream such as a private data stream. Message types that form the core functionality of a watermarking system are defined in this document. To allow for future expansion, it is possible to define new messages and add additional features to existing messages. Where practical, the messages have been designed according to object oriented principles. For example, many messages are a combination of a reference to an object (e.g., some data structure maintained by an OPIMA terminal), an action (method) to be performed on that object, and any other parameters needed to carry out the requested action. The messages, objects, and methods have been designed to be as general as practicable. It should be possible to implement a wide variety of watermarking techniques by combining the various messages in different ways.

Many watermark techniques operate in the frequency domain by modifying the spectral characteristics of a video, but a watermark can be placed in the spatial (pixel) domain of a video. Watermarking in the spatial domain has some interesting advantages. For instance, some digital video display devices have the ability to scale the video after it is decoded, e.g., to convert NTSC to a format suitable for display on a computer monitor. The detrimental effect that this scaling has on the watermark can be avoided if it is possible to insert the watermark into the video in the spatial domain after the video has been scaled. Also, if watermarks are inserted directly into an MPEG-2 video stream in an I or P frame, the watermark can affect the display of several frames, which may make the watermark more easily perceived. Of course, one disadvantage of placing watermarks in the spatial domain is that it is not possible to protect an MPEG-2 video stream without decoding and re-encoding at least part of the video.

The spatial domain watermarking concepts presented in this section concentrate on the watermarking of each picture (frame) comprising the video. A picture might be obtained by decompressing an unwatermarked MPEG bitstream. The picture is a rectangular array (matrix) of pixel values:

$$v_{i,j}, i=0,1,2,K,I-1, j=0,1,2,K,J-1$$

Watermarking produces a picture, $v'_{i,j}$, with some bits hidden in it, e.g., some of the bits comprising the bit string denoted by $B_e$. A bit or a group of bits are inserted into a picture by modifying a rectangular region of the picture:

$$v'_{i,j} = \begin{cases} r_l(v_{i,j}, x_{i-i_0, j-j_0}), & \text{if } 0 \leq i - i_0 < M \text{ and } 0 \leq j - j_0 \leq N, \\ v_{i,j}, & \text{otherwise,} \end{cases}$$

where $x_{m,n}$, in $=0, 1, 2, K, M-1, n=0, 1, 2, K, N-1$ is the watermark (a matrix), $(i_0, j_0)$ is the location (coordinates) in the picture of the upper left corner of the modified rectangular region, and $r_l$ is some insertion (modulation) method, such as one of those listed in Table 1. $\alpha_A$, $\alpha_P$, and $\alpha_E$ are parameters that control the strength of marks that are inserted by addition, multiplication, and exponentiation, respectively. This insertion process corresponds to watermark modulator 1 in FIG. 7. Note that the insertion process may be repeated to insert as many watermarks as desired into a picture.

TABLE 1

Watermark Insertion Methods

| Insertion Method | Insertion Function |
|---|---|
| replace | $r_0(v, x) = x$ |
| add | $r_1(v, x) = v + \alpha_A \cdot x$ |
| product | $r_2(v, x) = v \cdot (1 + \alpha_P \cdot x)$ |
| exponential | $r_3(v, x) = v \cdot \exp(\alpha_E \cdot x)$ |

Suppose a watermark that represents a single bit is introduced into the picture. This watermark is given by, $$x_{m,n} = \begin{cases} x_{m,n}^0, & \text{if } b_i = 0, \\ x_{m,n}^1, & \text{if } b_i = 1, \end{cases}$$

where $b_i$ is the bit (e.g., the ith bit of the bit string, $B_e$) and $x_{m,n}^0$ and $x_{m,n}^1$ are the versions of the watermark associated with a bit value of 0 and 1, respectively, and $x_{m,n}^0$ are matrices of values. Each of these matrices are the same size (have the same dimension) as $x_{m,n}$. For clarity, in the remainder of this section, matrices like $x_{m,n}^0$ and $x_{m,n}^1$ are referred to as marks, whereas the term watermark is reserved for matrices and collections of matrices like $x_{m,n}$. Now suppose that a watermark represents 2 bits:

$$x_{m,n} = \begin{cases} x_{m,n}^0, & \text{if } b_{i+1} = 0 \text{ and } b_i = 0, \\ x_{m,n}^1, & \text{if } b_{i+1} = 0 \text{ and } b_i = 1, \\ x_{m,n}^2, & \text{if } b_{i+1} = 1 \text{ and } b_i = 0, \\ x_{m,n}^3, & \text{if } b_{i+1} = 1 \text{ and } b_i = 1, \end{cases}$$

where $b_i$ and $b_{i+1}$ are two adjacent bits, e.g., from the bit string, $B_e$, and $x_{m,n}^0$, $x_{m,n}^1$, $x_{x,n}^2$, and $x_{m,n}^3$ are four marks associated with the two bits having a combined value of 00, 01, 10, and 11, respectively. To represent three bits with one watermark, eight marks would be needed. Of course, this approach can be extended to an arbitrary number of bits, K, which would require $2^K$ marks: $x_{m,n}^k$, $k=0, 1, 2, K, 2^K-1$. As described subsequently, sometimes it is more efficient if the picture is not modified when all the bits are equal to 0, i.e., the case of all the bits being 0 is represented by the absence of a mark. This case is equivalent to the first mark being 0 ($x_{m,n}^0 = 0$, m=0, 1, 2, K, M-1, n=0, 1, 2, K, N-1). The method of encoding multiple bits into a single watermark is analogous to a technique commonly used in digital communications where multiple bits can be represented with one set of modulations. For example, in QPSK, 2 bits are represented by four different phase shifts.

Before delving into the syntax of the various watermarking messages, it is worthwhile to explain some concepts that are used repeatedly in the messages. Most messages begin with a class identification number (class_id) that uniquely identifies the type (class) of object which is the subject of the message. The class_id values can be selected so that they also serve as start codes or resynchronization markers like those used in MPEG-2 sequence, GOP, picture, and slice headers, e.g., in the event of a loss of data due to a communication error. Most messages also contain an object identification number (obj_id) that identifies the particular object which is the subject of the message. Two objects belonging to the same class would never have the same obj_id value, but two objects from different classes might have the same obj_id. To uniquely reference (designate) a particular object requires both the class_id and obj_id. Most messages are requests for the performance of some action, which is designated by a method code (method). Two different methods in the same class would never have the same method code, but two methods in different classes could have the same code. A particular method is uniquely identified by the combination of class_id and method. Some messages invoke methods to create (construct) or delete (destroy) an object belonging to a particular class (designated by obj_id and class_id). Objects are persistent; once created they continue to exist until they are explicitly destroyed or the content stream ends. If a message requests the construction of an object that already exists, the effect is the same as if the existing object has been destroyed and another object subsequently constructed. It is the responsibility of the designer of the messages to ensure that class_id, obj_id, and method values are correct.

The syntax defined in this section enables the following general approach to spatial domain watermarking:

Build a collection of marks stored in the terminal. Each mark can be transmitted to the terminal in the body of a message or a message can instruct the terminal to construct the mark using a given algorithm and parameters.

Insert the marks into the video to represent the bits comprising the watermark.

Replace or delete marks from the collection, if needed.

Using this approach, it is possible to implement different watermarking strategies. For instance, if sufficient bandwidth or computing power is available, different marks can be used for each transmitted bit by sending a different set of marks to the terminal for each bit. If bandwidth or computing power is at a premium, a set of marks can be sent to the terminal once and used for the entire duration of the content.

For spatial watermarking, a mark object (one of the $x_{m,n}^k$ matrices) is a matrix of values that can be used to modify a rectangular region of equal size in an uncompressed video frame. At present, the mark can be either a pseudo-random pattern automatically generated by a pseudo-random number generator in the terminal or a given array of values. The syntax for a mark is listed in Table 2. There are four methods (actions) for a mark: construct a pseudo-random mark (constructRandom), construct a mark from the given matrix element values (constructMatrix), delete the mark (destroy), and insert the mark into a picture (insert). To construct a pseudo-random mark, the insertion method type ($r_i$), the dimensions (size) of the mark (M and N), and the pseudo-random generator must be specified. The insertion method type is included in a mark object so that some intermediate values (such as $\alpha_4 \cdot x$) can be cached within the terminal, if desired. The pseudo-random generator object is created separately (by another message, described subsequently) and incorporated into a mark object by reference. The generator object provides a pseudo-random value for each element of the mark matrix. To construct a mark from matrix elements, the insertion method type and the matrix element values are given. An example syntax is listed in Table 3. More efficient and more convenient representations of this data are sought. When a mark object is destroyed, all the storage associated with it is released, i.e., the matrix is deleted. The insert method embeds a mark into the picture. This method is provided to allow the insertion of a static watermark, i.e., a watermark that does not depend on any bit values ($b_i$). The size of the mark and the insertion method type are given when the mark is constructed, so the only additional information required is a reference to the picture where the mark should go ($v_{i,j}$) and the location in that picture corresponding to the upper left corner of the mark, ($i_0$, $j_0$)

TABLE 2

Spatial Video Mark Syntax

| Syntax | No. of Bits | Mnemonic |
| --- | --- | --- |
| SpatialVidMark( ) { | | |
|   class_id | TBD | bslbf |

TABLE 2-continued

Spatial Video Mark Syntax

| Syntax | No. of Bits | Mnemonic |
| --- | --- | --- |
|   method | TBD | bslbf |
|   obj_id | TBD | uimsbf |
|   if (method == constructRandom) { | | |
|     VidMarkInsertType( ) | | |
|     x_size | 11 | uimsbf |
|     y_size | 11 | uimsbf |
|     PseudoRandomGeneratorRef( ) | | |
|   } else if (method == constructMatrix) { | | |
|     VidMarkInsertType( ) | | |
|     SpatialVidMarkPic( ) | | |
|   } else if (method == destroy) { | | |
|   } else if (method == insert) { | | |
|     PictureRef( ) | | |
|     X | 11 | uimsbf |
|     Y | 11 | uimsbf |
|   } | | |
| } | | |
| SpatialVidMarkRef( ) { | | |
|   class_id | TBD | bslbf |
|   obj_id | TBD | bslbf |
| } | | | class_id: A constant bit string (TBD) which identifies the object as belonging to the SpatialVidMark( ) class.

method: A code that indicates the action (method) to be performed.

obj_id: A value which uniquely identifies an object in the SpatialVidMark( ) class. VidMarkinsertType( ): The insertion method type, which specifies how the mark should be inserted into the video (see Table 13).

x_size: The horizontal dimension of the mark (N).

y_size: The vertical dimension of the mark (M).

PseudoRandomGeneratorRef( ): The pseudo-random number generator to be used to generate the mark (see Table 12).

SpatialVidMarkPic( ): The mark, represented as a small rectangular matrix (image). See Table 3.

PictureRef( ): Specifies which picture (video frame) the mark should be inserted into. x, y: The x, y coordinates, in the picture, where the top left corner of the mark is inserted ($i_0$, $j_0$).

TABLE 3

Spatial Video Mark Picture Syntax

| Syntax | No. of Bits | Mnemonic |
| --- | --- | --- |
| SpatialVidMarkPic( ) { | | |
|   x_size | 11 | uimsbf |
|   y_size | 11 | uimsbf |
|   pel_width | TBD | uimsbf |
|   for (j = 0; j < y_size; j++) { | | |
|     for (i = 0; i < x_size; i++) { | | |
|       pel | pel_width | tcimsbf |
|     } | | |
|   } | | |
| } | | | x_size: the horizontal dimension of the mark (N).

y_size: The vertical dimension of the mark (M).

pel_width: The value of this integer equals the number of bits used to represent each element of the matrix.

pel: A signed integer value representing one of the elements of the matrix.

The syntax for controlling the insertion of marks is listed in Table 4. A SpatialVidBitInserter( ) object is a collection (list)

of marks, $x_{m,n}^k$, k=0, 1, 2, K, $2^K$-1, any one of which is inserted into the video depending on the value of a bit or a group of bits from a bit string source ($B_e$). This object also contains a reference to the picture (frame) into which the marks are inserted ($v_{i,j}$) and the x, y coordinates in that picture where the mark should be placed ($i_0, j_0$). The construct method constructs a SpatialVidBitInserter( ) object from these constituent data structures. The destroy method deletes an object. The insert method extracts num_bits bits from the bit string source and inserts the corresponding mark into the picture at the coordinates that that were specified when the object was constructed.

TABLE 4

Spatial Video Bit Inserter Syntax

| Syntax | No. of Bits | Mnemonic |
|---|---|---|
| SpatialVidBitInserter( ) { | | |
|   class_id | TBD | bslbf |
|   method | TBD | bslbf |
|   obj_id | TBD | uimsbf |
|   if (method == construct) { | | |
|     BitSourceRef( ) | | |
|     PictureRef( ) | | |
|     X | 11 | uimsbf |
|     Y | 11 | uimsbf |
|     no_zero_mark | 1 | uimsbf |
|     num_bits | TBD | uimsbf |
|     for (i = 0; i < ((1<<num_bits) – no_zero); i++) { | | |
|       SpatialVidMaricRef( ) | | |
|     } | | |
|   } else if (method == destroy) { | | |
|   } else if (method == insert) { | | |
|   } | | |
| } | | | class_id: A constant bit string (TBD) which identifies the object as belonging to the Spatial VidBitInserter( ) class.
method: A code that indicates the action (method) to be performed.
obj_id: A value which uniquely identifies an object in the SpatialVidBitInserter( ) class.
BitSourceRef( ): Specifies a bit string source ($B_e$) that controls which mark gets inserted.
PictureRef( ): Specifies which picture (video frame) the mark should be inserted into (see Table 11).
x, y: The x, y coordinates, in the picture, where the top left corner of the mark is located ($i_0, j_0$).
no_zero_mark: If no_zero_mark=0, there is one mark for each possible value of the bit or group of bits and the number of mark references is $2^{num\_bits}$ (or $2^K$). If no_zero_mark=1, no mark is inserted when the bit or bits are equal to 0. In this case, 0 is represented by the original video, i.e., the absence of a mark. This situation is equivalent to the first mark being 0 ($x_{m,n}^0$=0, m=0, 1, 2, K, M-1, n=0, 1, 2, K, N-1) and, consequently, it is not necessary to provide a reference for the first mark so that the number of mark references is $2^{num\_bits}-1$ (or $2^K-1$).
num_bits: The value of num_bits equals the number of bits represented by this collection of marks (K). For instance, num_bits=1, if 1 bit is represented, num_bits=2 for 2 bits, and num_bits=3 for 3 bits.
SpatialVidMarkRef( ): A reference to a mark (see Table 2).

To help illustrate how a sequence of messages might be designed to implement a simple spatial watermarking technique, consider the messages illustrated in Table 5. A normally distributed pseudo-random number generator with a mean of 0 and a standard deviation of 4 is constructed and used to fill the elements of two mark matrices (image) that are 32 pixels wide and 12 pixels high. The mark will be inserted by adding it directly to the picture (video frame) pixel values without any scaling (since the amplitude is 1). A spatial video bit inserter is constructed that will, when requested, insert the second mark at coordinates (382, 186) in the referenced picture if the next bit extracted from the bit string is a 0 and will insert the first mark is it is a 1. Next, this bit is inserted into the picture. Finally, all the objects that were constructed (created) are destroyed.

TABLE 5

Example Watermarking Session

```
/* Construct a normally distributed pseudo-random number generator object. */
PseudoRandomNumberGenerator() {
    class_id = PseudoRandomNumberGenerator, method = constructNormal, obj_id = 1
    seed = 777,    mean = 0, std_dey = 4
}
/* Construct the first mark . */
SpatialVidMark( ) {
    class_id = SpatialVidMark, method = constructRandom, obj_id = 1
    VidMarkInsertType( ) { insert_type = add, amplitude = 1 }
    x_size = 32, y_size = 12
    PseudoRandomNumberGeneratorRef( ) { class_id = PseudoRandomNumberGenerator, obj_id = 1 }
}
/* Construct the second mark. */
SpatialVidMark( ) {
    class_id = SpatialVidMark, method = constructRandom, obj_id = 2
    VidMarkInsertType( ) { insert_type = add, amplitude = 1 },
    x_size = 32, y_size = 12
    PseudoRandomNumberGeneratorRef( ) { class_id = PseudoRandomNumberGenerator, obj_id = 1 }
}
/* Construct a bit inserter (a list of the 2 marks). */
SpatialVidBitInserter( ) {
    class_id = SpatialVidBitInserter, method = construct, obj_id = 1
    BitSourceRef( ) { TBD }
    PictureRef( ) { TBD }
    x = 382, y = 186
    no_zero = 0, num_bits = 0
    SpatialVidMarkRef( ) { class_id = SpatialVidMark, obj_id = 1 }
```

TABLE 5-continued

Example Watermarking Session

```
    SpatialVidMarkRef( ) { class_id = SpatialVidMark, obj_id = 2 }
}
/* Insert the appropriate mark, depending of the bit value. */
SpatialVidBitInserter( ) {
    class_id = SpatialVidBitInserter, method = insert, obj_id = 1
}
/* Destroy the bit inserter. */
SpatialVidBitInserter( ) {
    class_id = SpatialVidBitInserter, method = destroy, obj_id = 1
}.
/* Destroy the second mark. */
SpatialVidMark( ) {
    class_id = SpatialVidMark, method = destroy, obj_id = 2
{
/* Destroy the first mark. */
SpatialVidMark( ) {
    class_id = SpatialVidMark, method = destroy, obj_id = 1
}
/* Destroy the pseudo-random number generator. */
PseudoRandomNumberGenerator( )
    class_id = PseudoRandomNumberGenerator, method = destroy, obj_id = 1
}
```

Instead of dealing with pixel values, the transform domain watermarking concepts discussed in this section consider a matrix of transform coefficients:

$$v_{i,j}, i=0,1,2,K,I-1, j=0,1,2,K,J-1$$

The transform could be the DCT, FFT, a wavelet, or some other transform. The elements of the matrix could be scalar values or complex numbers. The matrix is the transform of a rectangular region of a picture (frame) comprising the video. For example, it might be an 8×8 DCT (a block) or the 720× 480 FFT of an entire NTSC frame. Watermarking hides some bits (e.g., from $B_e$ in FIG. 6) in these coefficients by inserting the watermark in some of the coefficient values:

$$v'_{s_m,t_m} = r_l(v_{s_m,t_m}, x_m), m=0,1,2,K, M-1$$

where $v_{s_m,t_m}$ are the modified transform coefficients, $x_m$, m=0, 1, 2, K, M−1 is the watermark (a vector),$(s_m t_m)$, m=0, 1, 2, K, M−1 is a list of locations (row and column coordinates) of the coefficients that are to be modified, and $r_l$ is some insertion (modulation) method (see Table 1). The list of locations, $(s_m, t_m)$, allows any arbitrary subset of the transform coefficients to be modified and is easily implemented in software as illustrated in the following C code fragment:

```
void insert (
int v_prime [I] [J], int v[I] [J], int x[M], int s[M], int t [M]
)
{
int rl(int, int);
int m;
for (m=0; m<M; m++) {v_prime [s[m]] [t[m]]=rl(v[s[m]]
    [t[m]] x[m]);
}
}
```

The list of locations generalizes the concept of the zigzag scan pattern used to access the DCT coefficient values in MPEG. The remaining transform coefficients (those not in the list) are not modified:

$$v'_{i,j} = v_{i,j}, \text{if } (i,j) \notin \{(s_m t_m): m=0,1,2,K,M-1\}.$$

Figure 6:
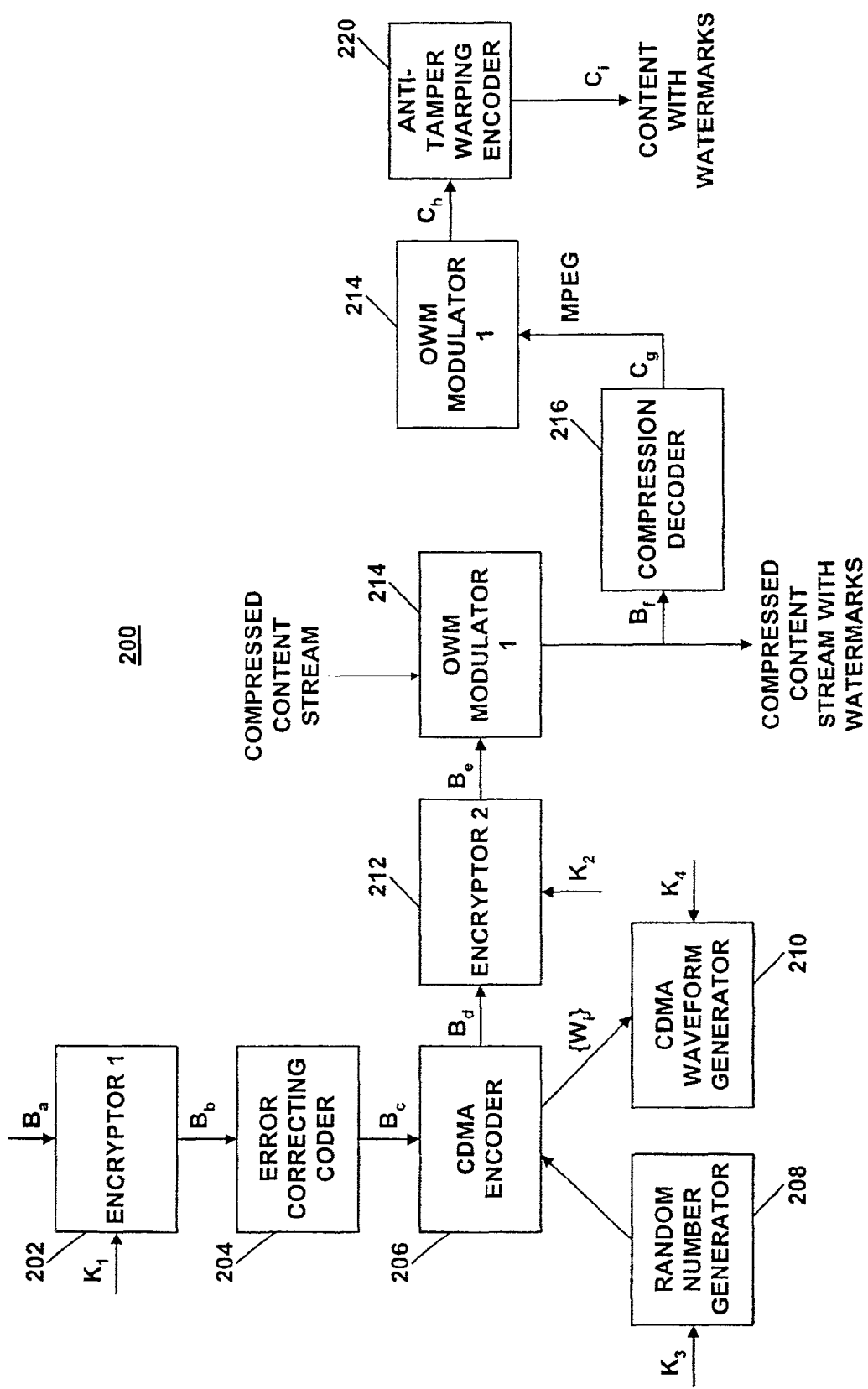
FIGS. 6 and 7 are block diagrams of watermark inserter and extractor systems implementing image modification.

Watermark insertion by this method corresponds to watermark modulator 1 in FIG. 6. The insertion process can be repeated to insert as many bits as needed into the transform coefficients.

Consider a watermark that represents a single bit. Similar to the spatial domain case, this watermark is given by, $$x_m = \begin{cases} x_m^0, & \text{if } b_i = 0, \\ x_m^1, & \text{if } b_i = 1, \end{cases}$$

where $b_i$ is the bit (e.g., the ith bit $B_e$) and $x_m^0$ and $x_m^1$ are the marks associated with a bit value of 0 and 1, respectively. $x_m^0$ and $x_m^1$ are vectors that are the same size as $x_m$. As in the spatial domain case, if a watermark represents 2 bits, $b_i$ and $b_{i+1}$, four marks $x_{m,n}^0$, $x_{m,n}^1$, $x_{m,n}^2$, and $x_{m,n}^3$ are used to denote the four possible values of 2 bits: 00, 01, 10, and 11. To represent three bits with one watermark requires eight marks. Extending these examples to an arbitrary number of bits, K, would require $2^K$ marks: $x_m^k$, k=0, 1, 2, K, $2^K-1$. An alternative is to use the absence of a mark to represent the case where all the bits are 0. This alternative is the same as the first mark being equal to $0(x_m^0=0, m=0, 1, 2, hK, M-1)$.

The messages defined in this section are intended to allow the following approach to transform domain watermarking:
   Build a collection of transform domain marks in the terminal. A mark can be sent to the terminal in a message or the terminal can construct the mark using an algorithm and parameters specified by a message.
   Compute the transform of a section of a picture (frame).
   Insert the mark into the transform coefficients.
   Perform the inverse transform and put the resulting section of a frame back into the original picture.
   Replace or delete marks from the collection as necessary.
   Various watermarking strategies can be realized in this manner.

The transform domain mark syntax is listed in Table 6. This mark is a vector (a 1-dimensional array) of transform coefficient values ($x_m^k$). The values can be either a pseudo-random sequence or they can be provided in the message. The methods (actions) that can be performed on a mark are: construct a pseudo-random mark (constructRandom), construct a mark from the given array of coefficients (constructArray), delete the mark (destroy), and insert the mark (insert). To construct a pseudo-random mark, the transform type (DCT, FFT, wavelet, etc.), the insertion method type ($r_l$), the number of coefficients (M), and the pseudo-random generator are specified. Another message (see Table 12) creates a pseudo-random number generator object and a reference to it provided when constructing a mark. The insertion method type is specified when the mark is constructed so that some of the intermediate values (such as $\alpha_{A \cdot x \text{ in Table } 1}$) can be cached within the terminal, if desired. To construct a mark from an array of coefficients, the same data is needed except that an array (list) of transform coefficient values replaces the pseudo-random number generator. The coefficient values can be scalars or complex numbers. Destroying a mark releases the storage associated with it. The mark is inserted into the transform by the insert method. This method does not use any bit values ($b_i$); a static watermark is inserted. The insertion method type and the number of coefficients in the mark are given when the mark is constructed. A reference to the transform coefficients ($v_{i,j}$) that the mark is inserted into and a reference to the list of locations to be modified (a scanning pattern), ($s_m, t_m$), is the only additional information required.

TABLE 6

Transform Domain Video Mark Syntax

| Syntax | No. of Bits | Mnemonic |
|---|---|---|
| TransformVidMark( ) { | | |
|   class_id | TBD | bslbf |
|   method | TBD | bslbf |
|   obj_id | TBD | uimsbf |
|   if (method == constructRandom) { | | |
|     transform_type | TBD | bslbf |
|     VidMarkInsertType( ) | | |
|     num_coeffs | TBD | uimsbf |
|     PseudoRandomGeneratorRef( ) | | |
|   } else if (method == constructArray) { | | |
|     transform_type | TBD | bslbf |
|     VidMarkInsertType( ) | | |
|     num_coeffs | TBD | uimsbf |
|     for (i = 0; i < num_coeffs; i++) { | | |
|       TransformCoeff(transform_type) | | |
|     } | | |
|   } else if (method == destroy) { | | |
|   } else if (method == insert) { | | |
|     VidTransformRef( ) | | |
|     ScanPatternRef( ) | | |
|   } | | |
| } | | |
| TransformVidMarkRef( ) { | | |
|   class_id | TBD | bslbf |
|   obj_id | TBD | uimsbf |
| } | | |
| TransformCoeff(transform_type) { | | |
|   if (transform_type == dct) { | | |
|     dct_coeff | TBD | tcimsbf |
|   } else if (transform_type == fft) { | | |
|     real_fft_coeff | TBD | TBD |
|     imag_fft_coeff | TBD | TBD |
|   } else if (transform_type == wavelet) { | | |
|     TBD | TBD | TBD |
|   } | | |
| } | | | class_id: A constant bit string (TBD) which identifies the object as belonging to the TransformVidMark( ) class.
method: A code that indicates the action (method) to be performed. θobj_id: A value which uniquely identifies an object in the TransformVidMark( ) class.
transform_type: A bit string that indicates the type of transform (e.g., DCT, FFT, or wavelet).
VidMarkInsertType( ): The insertion method type ($r_l$), which specifies how the mark should be inserted into the previously computed transform (see Table 13).

num_coeffs: This value equals the number of transform coefficients contained in the array (M)
PseudoRandomGeneratorRef( ): The pseudo-random number generator to be used to generate the mark (see Table 12).
TransformCoeff(transform_type): A transform coefficient value for the given type of transform ($x_m^k$).
VidTransformRef( ): Specifies which previously computed transform the mark should be inserted into.
ScanPatternRef( ): A reference to the scanning pattern or list of locations, ($s_m, t_m$), as defined in Table 8, that determines which of the previously computed transform coefficients is modified by insertion.
dct_coeff: A DCT coefficient value.
real_fft_coeff: The real part of an FFT coefficient value.
imag_fft_coeff: The imaginary part of an FFT coefficient value.

The syntax for inserting transform domain marks is listed in Table 7. The TransformVidBitInserter( ) class represents a list of marks, any one of which can be inserted into the transform depending on the value of a bit or bits from a bit string source (e.g., $B_e$). The mark is inserted into the set of coefficients obtained from a previously computed transform ($v_{i,j}$), incorporated by reference, VidTransformRef( ). A scanning pattern, ($s_m, t_m$), controls which coefficients are modified during insertion and which coefficients are left undisturbed. This scanning pattern is analogous to the zigzag or alternate scanning patterns for DCT coefficients in MPEG-2 except that any pattern can be specified and the pattern need not contain all the coefficients in the previously computed transform. After insertion, an inverse transformation is computed and the resulting spatial (pixel) domain values are inserted into the specified picture (frame) at the given x, y coordinates. All these constituent data structures are given when the TransformVidBitInserter( ) object is constructed using the construct method. The object is deleted with the destroy method. The insert method get num_bits bits from the bit string source and inserts the appropriate mark.

TABLE 7

Transform Domain Video Bit Inserter Syntax

| Syntax | No. of Bits | Mnemonic |
|---|---|---|
| TransformVidBitInserter( ) { | | |
|   class id | TBD | bslbf |
|   method | TBD | bslbf |
|   obj_id | TBD | uimsbf |
|   if (method == construct) { | | |
|     BitSourceRef( ) | | |
|     PictureRef( ) | | |
|     X | 11 | uimsbf |
|     Y | 11 | uimsbf |
|     VidTransformRef( ) | | |
|     no_zero | 1 | bslbf |
|     num_bits | TBD | uimsbf |
|     for (i = 0; i < ((1<<num_bits) − no_zero); i++) { | | |
|       ScanPatternRef( ) | | |
|       TransforrnVidMarkRef( ) | | |
|     } | | |
|   } else if (method == destroy) { | | |
|   } else if (method == insert) { | | |
|   } | | |
| } | | | class_id: A constant bit string (TBD) which identifies the object as belonging to the TransformVidBitInserter( ) class.
method: A code that indicates the action (method) to be performed.

obj_id: A value which uniquely identifies an object in the Spatial VidBitInserter( ) class.

BitSourceRef( ): Specifies a bit string source to be used to control which mark gets inserted.

PictureRef( ): Specifies which picture (video frame) the mark should be inserted into (see Table 11).

x, y: The x, y coordinates, in the picture, where the top left corner of the mark is located.

no_zero_mark: If no_zero_mark=0, there is one mark for each possible value of the bit or group of bits and the number of mark references is $2^{num\_bits}$ (or $2^K$). If no_zero_mark=1, no mark is inserted when the bit or bits are equal to 0. In this case, 0 is represented by the absence of a mark. This situation is equivalent to the first mark being 0 (=0, m=0,1, 2, K, M−1) and, consequently, it is not necessary to provide a reference for the first mark so that the number of mark references is $2^{num\_bits}-1$ (or $2^K-1$).

num_bits: The value of num_bits equals the number of bits represented by this collection of marks (K). For instance, num_bits=1, if 1 bit is represented, num_bits=2 for 2 bits, and num_bits=3 for 3 bits.

ScanPatternRef( ): A reference to the scanning pattern or list of locations, $(s_m, t_m)$, as defined in Table 8, that determines which of the previously computed transform coefficients is modified by insertion.

TransformVidMarkRef( ): A reference to a mark (see Table 6).

Figure 12:
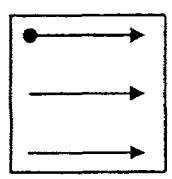
Figure 12:
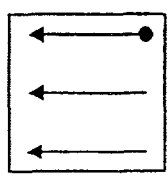
Figure 12:
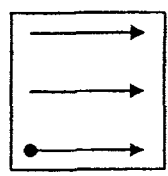
Figure 12:
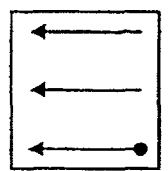
Figure 12:
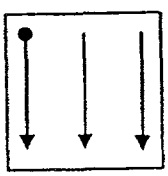
Figure 12:
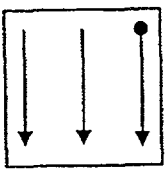
Figure 12:
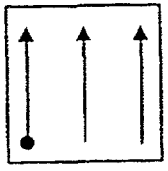
Figure 12:
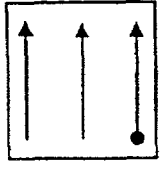
Figure 12:
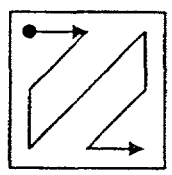
Figure 12:
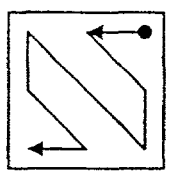
Figure 12:
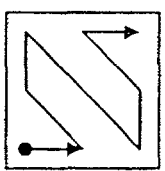
Figure 12:
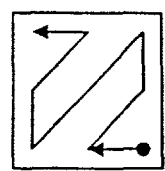
Figure 12:
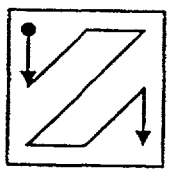
Figure 12:
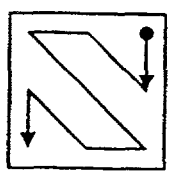
Figure 12:
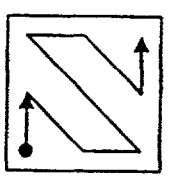
Figure 12:
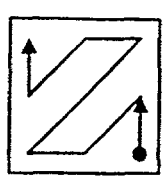
Figure 13:
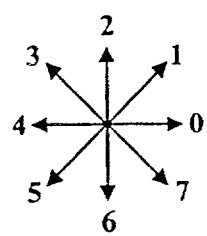
Figure 13:
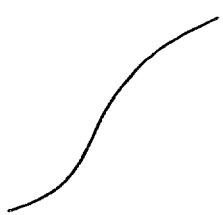
Figure 13:
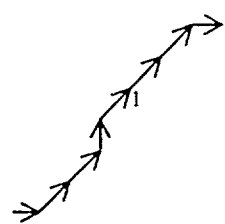

To select or specify a subset of the coefficient values comprising a 2-D transform such as the DCT, the FFT, or a wavelet transform, the ScanPattern( ) class is used. The syntax for the class is listed in Table 8. Four types of scanning patterns can be constructed: (1) zigzag, like the default DCT scanning pattern, (2) rectangular, like the order in which words are put on a page, (3) a list of locations (row and column coordinates), (4) a chain coded scan that is completely specified by data provided when the scanning pattern is constructed. The zigzag and rectangular scans both cover a rectangular area of the transform coefficients. Consequently, the rectangular region that is covered must be specified by giving the row and column (corner1_u and corner1_v) of the first scanned coefficient in the matrix of transform coefficients and the row and column (corner2_u and corner2_v) of the last scanned coefficient. Also, for each of these scans, there are two different patterns that can fill the rectangle, depending on whether the first step is a horizontal or vertical one (which is specified by the horizontal bit flag). These scanning patterns are illustrated in FIG. 12. The dot at the base of the arrows indicates the location given by corner1_u and corner1_v. The corner diagonally opposite is given by corner2_u and corner2_v. The list of locations scanning pattern is a list of row and column pairs, $(s_m, t_m)$, m=0, 1, 2, K, M−1. The chain coded scan is a continuous contour through the transform coefficients that is represented using a chain code. From any point in the matrix, a step to any one of the 8 adjacent points in the matrix can be specified by a value between 0 and 7 as illustrated in FIG. 13. The contour is represented by the starting row and column (begin_u and begin_v) of the first scanned coefficient and a list of steps (step_dir) to take from there.

TABLE 8

Transform Scan Pattern Syntax

| Syntax | No. of Bits | Mnemonic |
|---|---|---|
| ScanPattern( ) { | | |
| class_id | TBD | bslbf |
| method | TBD | bslbf |

TABLE 8-continued

Transform Scan Pattern Syntax

| Syntax | No. of Bits | Mnemonic |
|---|---|---|
| obj_id | TBD | uimsbf |
| if (method == constructZigZag \|\| method == constructRectangle) { | | |
| corner1_u | 11 | uimsbf |
| corner1_v | 11 | uimsbf |
| corner2_u | 11 | uimsbf |
| corner2_v | 11 | uimsbf |
| horizontal | TBD | bslbf |
| } else if (method == constructLocations) { | | |
| num_locs | TBD | uimsbf |
| for (i = 0; i < num_locs; i++) { | | |
| u | 11 | uimsbf |
| v | 11 | uimsbf |
| } | | |
| } else if (method == constructChain) { | | |
| begin_u | 11 | uimsbf |
| begin_v | 11 | uimsbf |
| num_steps | TBD | uimsbf |
| for (i =0; i < num_steps; i++) { | | |
| step_dir | TBD | bsibf |
| } | | |
| } else if (method == destroy) { | | |
| } | | |
| } | | |
| ScanPatternRef( ) { | | |
| class_id | TBD | bslbf |
| obj_id | TBD | uimsbf |
| } | | | class_id: A constant bit string (TBD) which identifies the object as belonging to the ScanPattern( ) class.

method: A code that indicates the action (method) to be performed.

obj_id: A value which uniquely identifies an object in the ScanPattern( ) class.

corner1_u, corner1_v: For a zigzag or rectangular scan, the row and column of the first scanned coefficient in the matrix of transform coefficients.

corner2_u, corner2_v: The row and column of the last scanned coefficient. horizontal: A bit flag that specifies if the first step in a zigzag or rectangular scan is horizontal or vertical.

num_locs: The number of locations in the list (M).

u, v: A row and column coordinate pair $(s_m, t_m)$.

begin_u, begin_v: The starting row and column of the first scanned coefficient of a chain coded scan.

step_dir: A value between 0 and 7 that specifies the direction to take when moving from one coefficient in the matrix of transform coefficients to any one of the 8 adjacent coefficients in the matrix.

The VidTransform( ) class represents a transform of a rectangular region of a picture (frame) of the video. The type of transform to be computed, the picture to be used, and the rectangular region must be specified when constructing a VidTransform( ) object using the construct method.

TABLE 9

Video Transform Syntax

| Syntax | No. of Bits | Mnemonic |
|---|---|---|
| VidTransform( ) { | | |
| class_id | TBD | bslbf |
| method | TBD | bslbf |
| obj_id | TBD | uimsbf |

TABLE 9-continued

Video Transform Syntax

| Syntax | No. of Bits | Mnemonic |
|---|---|---|
| if (method == construct) { | | |
|   transform_type | TBD | bslbf |
|   PictureRef( ) | | |
|     begin_x | 11 | uimsbf |
|     begin_y | 11 | uimsbf |
|     end_x | 11 | uimsbf |
|     end_y | 11 | uimsbf |
| } else if (method == destroy) { | | |
| } | | |
| } | | |
| VidTransformRef( ) { | | |
|   class_id | TBD | bslbf |
|   obj_id | TBD | uimsbf |
| } | | | class_id: A constant on string (TBD) which identifies the object as belonging to the VidTransform( ) class.
method: A code that indicates the action (method) to be performed.
obj_id: A value which uniquely identifies an object in the VidTransform( ) class.
transform_type: A bit string that indicates the type of transform (e.g., DCT, FFT, or wavelet).
PictureRef( ): A rectangular region of pixels in this picture (video frame) is the data source (input) for the transform.
begin_x, begin_y: The x, y coordinates of the top left corner of the rectangular region.
end x, end v: The x, y coordinates of the bottom right corner of the rectangular region.

To allow the capabilities of the watermarking system to be upgraded and extended, it must be possible to define and use new object types (classes) and new methods for these or existing objects. One part of this process is the registration of the new class_id and method values, i.e., a set of messages are needed to inform the terminal that these new values can be used. The way in which registration is carried out is necessarily dependent to some extent upon the trusted methodology used to download data and software, like the TMW. For instance, to associate a new value of class_id and method with new code (software) that is downloaded to the terminal, it must be possible to refer to the new code in some way that cannot be fully specified until the secure download functions are well-defined. As an alternate approach, the registration of new class_id and method values might be included as part of the secure download functions.

TABLE 10

Registration Syntax

| Syntax | No. of Bits | Mnemonic |
|---|---|---|
| Registration( ) { | | |
|   class_id | TBD | bslbf |
|   method | TBD | bslbf |
|   if (method == registerClass) { | | |
|     new_class_id | IBD | bslbf |
|   } else if (method == registerMethod) { | | |
|     existing_class_id | TBD | bslbf |
|   } | | |
|   num_methods | TBD | uimsbf |
|   for (i = 0; i < num methods; i++) { | | |
|     method_code | TBD | bslbf |
|     MethodRef( ) | | |
|   } | | |
| } | | | class_id: A constant bit string (TBD) which identifies the object as belonging to the Registration( ) class. There is only one such object, so no obj_id value is needed.
method: A code that indicates the action (method) to be performed.
new_class_id: The class_id value for the new class that is being registered.
existing_class_id: The class_id value of an existing class for which a new method is being registered.
num_methods: The number of new methods being registered.
method_code: The method value for each new method that is being registered.
MethodRef( ): A reference to a method that has previously been downloaded to the terminal.

The syntax for messages that manipulate common types of objects is described in this section. The types of objects are: a picture (frame) reference, a pseudo-random number generator, the type of video mark insertion method, a DCT of a section of video, and the scan pattern for scanning through transform coefficients, e.g., DCT coefficients.

In some instances, it is necessary to refer to a particular picture (frame) in a video stream. The syntax in Table 11 specifies a picture reference. Please refer to ISO/IEC 13818-1 for more information on stream IDs and presentation time stamps.

TABLE 11

Picture Reference Syntax

| Syntax | No. of Bits | Mnemonic |
|---|---|---|
| PictureRef( ) { | | |
|   video_stream_id | 8 | uimsbf |
|   pts | 33 | uimsbf |
|   picture_offset | TBD | uimsbf |
| } | | | video_stream_id: The video stream ID value, which identifies the referenced video stream.
pts: A presentation time stamp (PTS) within the specified video stream. The PTS specifies a particular presentation unit within the video stream.
picture_offset: The number of pictures (frames) beyond the first picture in the presentation unit specified by the PTS value.

A pseudo-random number generator potentially can be used in several places in a watermarking technique. A pseudo-random number generator can be set-up and controlled using the syntax in Table 12. The algorithm used to create the pseudo-random numbers needs to be universally agreed upon since, in many watermarking techniques, the same pseudo-random sequence must be generated in both the watermark inserter and extractor. For this reason, it is also important that, if the construction (creation) of multiple pseudo-random number generator objects is requested, each object should have separate internal state variables. Numbers should generated only when requested by a message so that the internal state can be recreated if needed. A pseudo-random number generator is constructed (created) by specifying the seed value, the distribution, and the parameters of the distribution. Three different distributions are supported: uniform, normal (Gaussian), and discrete. A uniform distribution is specified by the upper and lower bounds of the pseudo-random numbers to be generated. A normal distribution is specified by the mean and standard deviation. A discrete distribution is specified a list of the discrete values the generator can return and the probability of occurrence associated with that value. One example of a discrete distribution is a binary random variable with an equal probability of occurrence for 0 and 1, which is listed in the following table:

| Discrete Value | Probability |
|---|---|
| 0 | 0.50 |
| 1 | 0.50 |

TABLE 12

Pseudo-Random Number Generator Syntax

| Syntax | No. of Bits | Mnemonic |
|---|---|---|
| PseudoRandomGenerator( ) { | | |
| class_id | TBD | bslbf |
| method | TBD | bslbf |
| obj_id | TBD | uimsbf |
| if (method == constructUniform) { | | |
| seed | TBD | uimsbf |
| lower_bound | TBD | tcimsbf |
| upper_bound | TBD | tcimsbf |
| } else if (method == constructNormal) { | | |
| seed | TBD | uimsbf |
| mean | TBD | tcimsbf |
| std_dev | TBD | tcimsbf |
| } else if (method == constructDiscrete) { | | |
| num_values | TBD | uimsbf |
| for (i = 0; i < num_values; i++) { | | |
| discrete | TBD | tcimsbf |
| prob | 16 | uimsbf |
| } | | |
| } else if (method == destroy) { | | |
| } else if (method == setSeed) { | | |
| seed | TBD | uimsbf |
| } | | |
| } | | |
| PseudoRandomGeneratorRef( ) { | | |
| class_id | TBD | bslbf |
| obj_id | TBD | uimsbf |
| } | | | seed: The pseudo-random number generator seed. If the specified seed value is TBD, the terminal should compute and use a seed value such that the seed is different each time this option is invoked (e.g., by computing it from the system clock).

lower bound: The lower bound of the range of values that may be returned by the uniformly distributed pseudo-random number generator.

upper_bound: The upper bound of the range of values that may be returned by the generator.

mean: The mean of the normally distributed pseudo-random number generator.

std_dev: A value representing the standard deviation of the generator.

num_values: The number of discrete values that may be returned by the pseudo-random number generator discrete: One of the discrete values that may be returned by the generator.

prob: The probability of the generator returning the corresponding discrete value, expressed as the numerator of a fraction with a denominator of $2^{16}=65536$. For example, if $prob=16384$, the probability is $16384/65536=0.25$. The sum of all the values of prob must equal 65536 (a probability of 1).

In several instances, the way a mark should be inserted into the video (or the transform coefficients of a video) must be specified. The syntax in Table 13 is used for such a specification.

TABLE 13

Video Mark Insertion Type Syntax

| Syntax | No. of Bits | Mnemonic |
|---|---|---|
| VidMarkInsertType( ) { | | |
| insert_type | 2 | bslbf |
| if (insert_type == replace) { | | |
| } else if (insert_type == add) { | | |
| amplitude | TBD | uimsbf |
| } else if (insert_type == product) { | | |
| proportion | TBD | uimsbf |
| } else if (insert_type == exponential) { | | |
| exponent | TBD | TBD |
| } | | |
| } | | | insert_type: A bit string which indicates the mark insertion method (see Table 14).

amplitude: A value which corresponds to $\alpha_A$ that controls the strength of a mark which is added to the video.

proportion: A value which corresponds to $\alpha_P$ that controls the strength of a mark which is multiplied with the video.

exponent: A value which corresponds to $\alpha_E$ that controls the strength of a mark which is exponentially weighted and multiplied with the video.

TABLE 14

Video Mark Insertion Methods

| insert_type | Bit String | Insertion Method |
|---|---|---|
| replace | TBD | $v_i' = x_i$ |
| add | TBD | $v_i' = v_i + \alpha_A \cdot x_1$ |
| product | TBD | $v_i' = v_i \cdot (1 + \alpha_P \cdot x_i)$ |
| exponential | TBD | $v_i' = v_i \cdot \exp(\alpha_E \cdot x_i)$ |

$v'_i$: The marked video signal.
$x_i$: The mark.
$v_i$: The original (unmarked) video signal.
$\alpha_A, \alpha_P, \alpha_E$: Parameters that control the strength of marks that are inserted by addition, multiplication, and exponentiation, respectively.

It should be noted that $v'_i$, $v_i$, and $x_i$ can denote values in either the spatial or frequency (transform) domains.

Implementation

Referring now to FIG. 1, a user terminal 100 in a multimedia system, that may be incorporated in, or provided with, a set top box in, for example, an OPIMA compliant terminal, is configured to receive scrambled and possibly encrypted multimedia content from a service or content provider. The multimedia content may comprise audio, video, still picture, software, etc., received by way of any suitable link, such as optical fiber, hard wire, RF, etc. The received content is applied to a descrambler 102 that produces descrambled, but still compressed, content in a form that conforms, for example, to MPEG standard. The compressed content, when reproduced, is decoded to produce an analog output that is applied to a television or a monitor, in the case of video content, or to another reproduction device. Watermark data are inserted into the data stream and becomes part of the output of the terminal, such that any reproduction of the output signal developed by the terminal will bear the watermark. The watermark is a digital signal that identifies when and where playback has occurred. For example, the watermark may be in the form of "running marks" of the type described in copending application Ser. No. 09/092,898, filed on Jun. 8, 1998 and incorporated herein by reference, that identify the source-of-copying (that is, the DVD, DVD player and time of play). This "source-of-copying" information can be used to trace to the copyist, to control copying, or both, as described in the copending application.

With this background in mind, with reference again to FIG. 1, the compressed content, descrambled by unit 102, can have watermark data inserted either before or after decoding, or can be performed both before and after decoding. Thus, the compressed multimedia content is applied to tracing watermark inserter 104a to provide a digital output that is a bitstream containing both compressed digital content and watermark data, and then to decoder 108a (such as an MPEG-2 decoder) to produce a corresponding first analog output. Alternatively, or additionally, as shown, the compressed digital content can be routed first to decoder 108b and then to tracing watermark inserter 104b to produce a second analog output signal.

The digital output from watermark inserter 104a may be applied to a recorder 112 for recording the content on a recording medium, such as a DVD. The recorder enables recording to be performed only if the bitstream is found by copy protection watermark detector 114 to contain a watermark that permits copying. The watermark may include data that permits copying, prohibits copying or permits limited or conditional copying. Detection of the watermark can be performed by any suitable digital filtering process.

Figure 2:
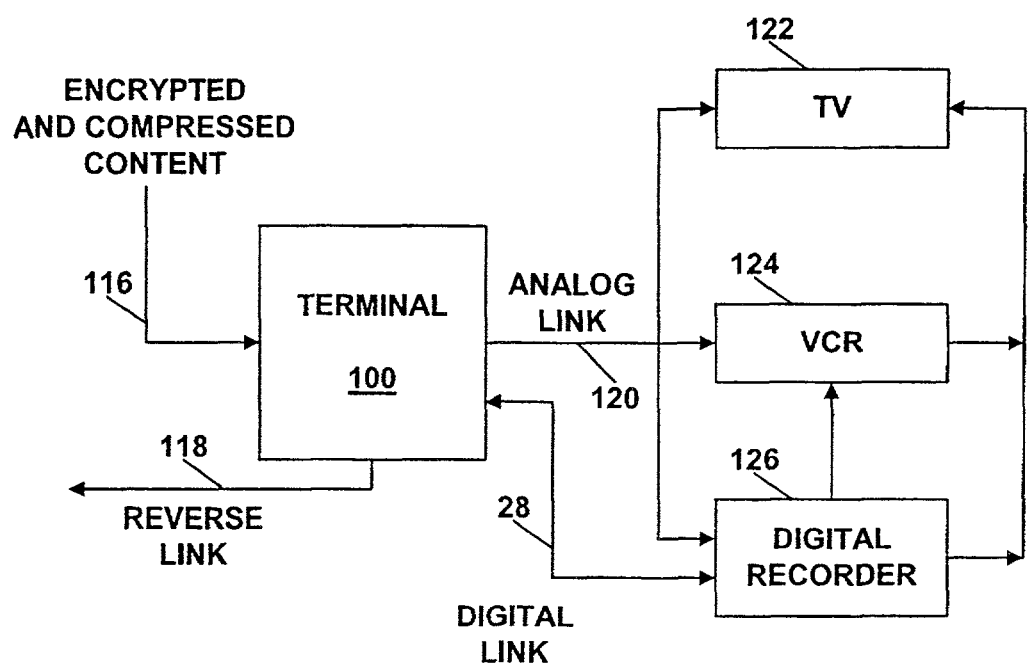
FIG. 2 shows the terminal interconnected with television and recorder appliances at a user facility.

FIG. 2 shows the terminal 100 as it may be connected to a television and analog/digital recording equipment in this invention. Encrypted and compressed multimedia content produced by a content provider, obtained via cable, satellite, etc., is applied to the terminal at line 116. A reverse link 118 enables the terminal to communicate back to the provider, via telephone link or other transmission medium, to transfer billing information, polling, etc., in a known manner. The output of the terminal 100 produces analog and digital signals, separately, as described previously. Analog link 120, corresponding to analog output 1 or analog output 2 in FIG. 1, is applied to TV 122, VCR 124 and digital recorder 126. The digital output 128 of the terminal is applied only to the digital recorder 126. The VCR 124 and digital recorder 126 are supplied to television 122 in a conventional manner.

As explained in the copending application, the watermark, added to the data stream each time playback of content received from a provider or reproduced from a prerecorded medium is played, comprises virtually invisible marks embedded into the compressed digital data stream. These marks may identify the player unit, content source and time of play, to help enable trace to the copyist. The best mode of the invention is described within the context of a video stream produced in an MPEG-2 domain, although it is to be understood that the invention is not limited thereto. For example, the source-of-copying message, embedded in the watermark, can be combined into an audio signal or into software using similar principles. The watermarks are not visible to a viewer, but can be detected and decoded by hardware maintained by an authorized institution. The institution, in possession of a DVD, for example, containing protected material, will play the material using equipment that detects and decodes the watermark. The information embedded in the watermark, for example, the serial number of the player used to make the copy, the serial number of the master from which the copy was made and the time the copy was made, may help the institution trace to the copyist. Alternatively, or in addition, the watermark may contain data that will prevent an unauthorized user to reproduce the content from the master, or limit the number of copies that can be made, as explained previously.

Just as there are many different approaches to digital watermarking, there can be as many, of not more, methods for pirates to attack the watermark system by applying different signal processing techniques. A watermark system must be robust sot that the embedded signal is difficult to detect, remove or modify, except by the owner of the protected digital content.

Figure 4:
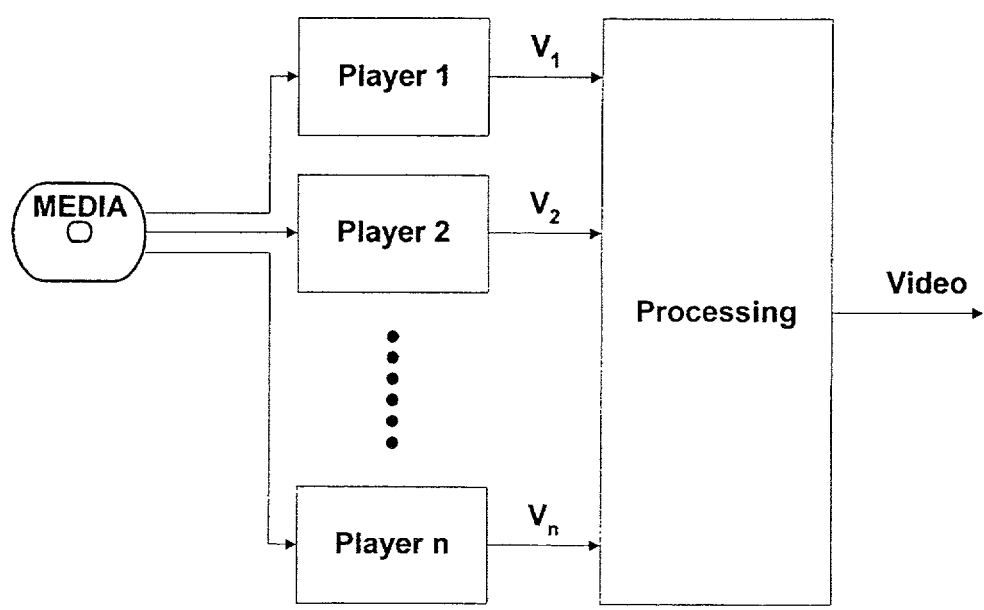
FIG. 4 shows a multiple player environment, in which image modification per another aspect of the invention is implemented.

As described in the copending application, a pirate copyist may attempt to attack the running mark system for producing digital watermarks by combining video outputs from multiple playback units. Referring to FIG. 4, a copyist may combine the outputs of N players playing a DVD, or other protected medium, to produce a reproduction from which many copies will be made for illicit distribution. The pirate copy is then made by averaging or simply time-multiplexing among the copies.

Figure 5:
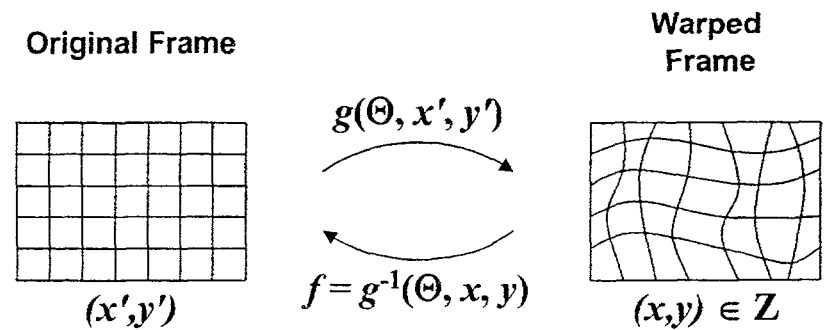
FIG. 5 depicts graphs depicting image mapping and re-alignment implementing an embodiment of image modification in accord with the invention

This form of attack by a pirate is countered, in accord with the present invention, by adding a further level of signal processing that will alter the image, produced by the playback unit in an imperceptible way. Each playback unit imposes a different alteration, known only to the content owner, so that without correction the image produced by combining copies from multiple playback units will be degraded and unwatchable. Referring to FIG. 5, the image reproduced by each playback unit undergoes a spatial transformation that is dictated by a mapping function $F(\theta)$. Altering of the image may be performed by any conventional image mapping functionality. Each playback unit may have a prescribed mapping function assigned to it, or may select among any number of pre-stored mapping functions, based on a key that could be read from the video stream, read from the DVD or developed in some other manner.

The mapping function could, for example, warp the image, shown in FIG. 5, by compressing the spacing between pixels in the vertical direction and expanding the positions in the horizontal direction. The amount of warping is subtle, so that playing a copy made by a single playback unit is not noticed by a viewer. However, when the outputs of many playback units are combined, each with a slightly different mapping function, the composite image will be distorted (fuzzy) and not of commercial quality. A pirate copy with reasonable picture quality cannot be generated without first re-registering the copies to compensate for the deliberate alteration applied by the content owner. Although the pirate may be able to re-register the pixels, this is time consuming and impractical when an illicit copy made by multiple playback units is involved. In fact, the time required for a pirate to realign copies made by multiple playback units, each imposing a different mapping function, can be expected to require up to several months or more of labor. This will considerably delay the time when the pirate can distribute usable copies. For the content owner, on the other hand, not re-registration needs to be performed in order to retrieve the original content and watermarks, since the mapping function and its parameters are known and chosen from a pre-defined library.

The mapping function may be changed from time to time, such as periodically, to make it more difficult realign pixels if the pirate learns the mapping function. To avoid visible changes in the image reproduced by a single playback unit, the mapping functions preferably are selected such that successive functions alter the image only slightly. (A larger single change in image alignment may be visible, whereas a succession, over time, of several smaller changes may not.) As another possibility, the mapping function may change at the time of a scene change. In this example, a larger alteration of the image, by mapping, may be tolerated by the viewer.

Thus, pixels may be shifted in position, by different amounts among different players, and by a different amount each time a medium is played successively by a single player. The pixels must be realigned to the original pixel positions in the reproduced video upon decoding, by the pirate, so that the image will not appear distorted. A pirate will be able to perform the necessary realignment of pixels only by doing so for each and every copy that is combined to make an unauthorized master copy of a video. This work on the part of the pirate is made more difficult by the fact that the pirate will not have possession of the original.

The particular mapping function used for altering the image can be selected among many possibilities. Preferably, the function will provide image alteration that is invisible to the viewer, easy to apply, quickly generated and robust (not easily reversed by the pirate). The following mapping functions are examples.

A geometric transformation $f$ on image defines the mapping between two image coordinates, (x,y) and (x',y'). To warp one image from another, it is usually more convenient to define the backward warping so that each grid point (x,y) in the target (or warped) frame is mapped from a possibly non-grid point (x', y') in the original frame. Here we define the geometric transformation in terms of backward warping so that (x,y) is defined on grid points (i.e., x,y $\in$Z) while (x',y') can fall on sub-pixel locations (c.f. FIG. 5). The warping can be written as (x',y')=$f$($\Theta$,x,y) or:

$$x'=f_x(\Theta,x,y)$$

$$y'=f_y(\Theta,x,y)$$

Here $\Theta$ is the parameter set of the transformation. Backward warping is preferred over forward warping because it ensures that every grid point in the target frame has a matching point from the original so that it leaves "no holes" in the target frame. Applying an image interpolation function, the pixel values in the warped frame can then be computed. Popular interpolation schemes are: nearest neighbor, linear interpolation, and bilinear interpolation. A geometric transformation is separable if x'=$f_x$(x) and y'=$f_y$(y); it is linear if both $f_x$ and $f_y$ are a linear function of x and y.

We intend to apply the geometric transformation to not just one image, but a sequence of images (i.e. a video). One way to achieve this is that instead of applying a 2D spatial geometric transformation, we apply a 3D geometric transformation (spatial and temporal). In this case, the warping function warps a 3D volume in the (x,y,t) space.

$$x'=f_x(\Theta,x,y,t)$$

$$y'=f_y(\Theta,x,y,t)$$

$$t'=f_t(\Theta,x,y,t)$$

A simple example of $f_t$ is frame-dropping or frame-repeating. In general, although the idea of 3D warping is very appealing and more general, for practical reasons, it is more difficult to apply since a large frame buffer is required to store the whole volume of the video and the computation cost is usually high. Another approach that we shall focus on is to apply a sequence of 2D geometric transformations to the sequence of image frames, while allowing the parameter set of the warping function to be a function of time.

$$x'(t)=f_x(\Theta(t),x(t),y(t))$$

$$y'(t)=f_y(\Theta(t),x(t),y(t))$$

In this representation, the warping function remains a 2D geometric transformation at fixed time instant, while at different time both the function form and the parameters can be changed. In the following sections, we will first introduce a collection of 2D geometric transformations. Then we will discuss different function forms for achieving temporal warping, i.e., $\Theta$(t).

Many different representations are available for describing such a transformation for image warping. Table 15 summarizes a collection of geometric transformations that can be used for anti-tamper warping. The size of the parameter set and parameters are listed for comparison. Here we also provide some mathematical details of some of these functions.

TABLE 15

A collection of geometric transformations for anti-tamper warping.

| Category | Method | # Parameters | Parameter set $\Theta$ |
|---|---|---|---|
| Linear | Translation | 2 | $t_x, t_y$ |
| | Rotation | 3 | $\theta, x_0, y_0$ |
| | Scaling | 4 | $s_x, s_y, x_0, y_0$ |
| | Affine | 6 | $a_{x'x}, a_{x'1}, a_{x'x}, a_{y'x}, a_{y'}$ |
| Quadratic | Bilinear | 8 | $a_{x'x}, a_{x'x}, a_{y'1}, a_{y'}, 1_{y'y}, a_{y'y}, a_{y'y}, a_{y'}$ |
| | Pseudo-perspective | 8 | $a_{x'x}, a_{x'x}, a_{x'}, a_{x'x}, 1_{y'y}, a_{y'}, a_\alpha, a_\beta$ |
| | Biquadratic | 12 | $a_{x'x}, a_{x'x}, a_{x'x}, a_{x'x}, a_{1'1}, 1_{y'y}, a_{y'n}, a_{y'x}, a_{y'y}, a_{y'}$ |
| Higher-order Polynomial | P(n) | 2(n + 1) | 2(n + 1) interpolation points |
| Rational | R(n,m) | 2(n + m + 2) | 2(n + m + 2) interpolation points |
| | Projective | 8 | $a_{x'x}, a_{y'1}, a_1, 1_r, a_{1'1}, a_{1'}, a_\alpha, a_\beta$ |
| Spline | Cubic Spline | 4 or more/segment | 4 control points + other parameters |
| Motion Transform | Fourier | 2 · \|U\| · \|V\| | $M_x(u, v), M_t(u,v)$ | $u \in U, v \in V$ |
| | Wavelet | 2 · $\Sigma_i$\|$U_i$\| · \|$V_i$\| | $M_{x1}(u, v), M_t(u,v)$ | $u_l \in U_l, v_l \in V_l$ |
| LUT | 1-D | M + N | x → x', y → y' | x = 1 ... M; y = 1 ... N |
| | 2-D | 2 MN | (x, y) → x', (x, y) → y' | x = 1 ... M; y = 1 ... N |

The simplest linear transformation is 2D translation. it simply shifts the entire image by a vector $(t_x, t_y)$. Mathematically, it is as simple as:

$$x' = x + t_x$$

$$y' = y + t_y$$

Another simple linear transformation is 2D rotation, which has three parameters: the $$x' = (x - x_0)\cos(\theta) - (y - y_0)\sin(\theta) + x_0$$

$$y' = (x - x_0)\sin(\theta) + (y - y_0)\cos(\theta) + y_0$$

rotation center $(x_0, y_0)$ and the ratation angle $\theta$.

It is also easy to scale the image (zoom in/out). The 2D scaling takes four parameters: the scaling center $(x_0, y_0)$, the scaling factor along two image axis s, and s, respectively.

$$x' = s_x(x - x_0) + x_0$$

$$y' = s_y(y - y_0) + y_0$$

The most general 2D linear geometric transformation is the affine transformation. It has six parameters and can describe a combination of translation, rotation, scaling, and sheer of the image. Mathematically, it is written as:

$$x' = x + t_x$$

$$y' = y + t_y$$

The Quadratic Curves and Surfaces category uses $2^{nd}$ order polynomials to represent the coordinate transformation. The most general formula is the biquadratic transformation with twelve parameters:

$$x' = a_{x'x}2x^2 + a_{x'xy}xy + a_{x'y}2y^2 + a_{x'x}x + a_{x'y}y + a_{x'}$$

$$y' = a_{y'x}2x^2 + a_{x'xy}xy + a_{y'y}2y^2 + a_{y'x}x + a_{y'y}y + a_{y'}$$

Several commonly used $2^{nd}$-order transformations can be regarded as degenerated case of the biquadratic transformation. When the $x^2$ and $y^2$ terms do not exist (i.e. $a_{x'x}2 = a_{y'x}2 = a_{x'y}2 = a_{y'y}2 = 0$), it is called bilinear transformation, which has eight parameters. When $a_{y'x}2 = a_{x'y}2 = 0$ and $a_{x'x}2 = a_{y'xy} = a_\alpha$, $a_{y'y}2 = a_{x'xy} = a_\beta$, the transformation is called pseudo-perspective.

A higher order (greater than three) polynomial or rational functions can be used to generate a more complicated and yet smooth warping function. For simplicity and without loss of generality, we focus on the separable case: $x' = P_x^{(n)}(x)$ and $y' = P_y^{(n)}(y)$, both $P_x^{(n)}$ and $P_y^{(n)}$ are an n-th order polynomial. Since an n-th order polynomial contains n+1 coefficients, it can be uniquely defined by giving n+1 interpolation points (assuming no three points are colinear). In the non-separable case, a polynomial surface can be defined. A rational function $R^{(n,m)}$ is a quotient of two polynomials:

$$R^{(n,m)}(x) = \frac{P^{(n)}(x)}{Q^{(m)}(x)}$$

where both $P^{(n)}$ and $Q^{(m)}$ are polynomials. Projective transformation is a rational function (non-separable) commonly used in image processing to approximate the image change under rigid-body motion and perspective projection. It has the following form:

$$x' = \frac{a_{x'x}x + a_{y'y}y + a_{x'}}{a_\alpha x + a_\beta y + 1}$$

$$y' = \frac{a_{x'x}x + a_{y'y}y + a_{y'}}{a_\alpha x + a_\beta y + 1}$$

Note that there are common parameters in the denominators. Other transformations derived from 3D rigid-body motion with a 3D to 2D image projection function (e.g., perspective, para-perspective, orthographic, etc.) may also be considered as the warping function to create the effect of changing the camera viewing angle. However, they usually require the knowledge on the depth of different objects or points in the frame.

Cubic splines have been widely used in computer graphics applications to generate realistic scenes. A cubic spline can be defined by a group of points, called control points. Since each curve segment is a cubic polynomial with four coefficients, at least four constraints are needed, allowing us to formulate four equations and solve the four unknowns. The constraints usually comes from the end points, their tangents, and assumptions on the geometric continuity at the segment boundary. Different cubic splines use different constraints, and their capability to interpolate control points vary. For instance, a natural cubic spline interpolates all its control points while uniform B-spline does not interpolate any of its control points. For some splines, extra unknowns (parameters) are used to control the geometric continuity at the segment boundary. To use cubic spline as a warping function, we can apply different splines to x and y axis such as $x' = f_x(x)$ and $y' = f_y(y)$, both $f_x$ and $f_y$ are a spline curve. In this case, the geometric transformation is separable. In the non-separable case, a bicubic spline surface can be defined by given a set of control points in the 2D space. The number of parameters therefore increases significantly. One advantage of using spline function for image warping is that it is easy to control the warping of image boundary so that the boundary can be fixed. This makes the warping much more difficult to detect. Commonly used cubic splines include natural cubic spline (4), Hermite curve (4), Bezier curve (4), Uniform B-spline (4), Nonuniform B-spline (6), β-spline (5), Catmull-Rom curve (4), Kochanek-Bartels curve (7), and so on. (The number in the parentheses shows the number of parameters per curve segment.) For more details on these splines, including their constraints and parameters, please refer to [12].

Applying a geometric transformation to the image can be considered equivalent as applying a motion vector to all the image pixels. This is different from the translation case since the motion vector is a function of the pixel location.

$$x' = x + m_x(x, y)$$

$$y' = y + m_x(x, y)$$

If each $m_x$, and $m_y$ is independently specified, it would take too many parameters to describe the motion field. Motion transform uses a small number of paramters to represent the motion vectors $m_x$ and $m_y$ in a transform domain (e.g., frequency domain) instead of the image domain. The transform is defined based on a set of basis functions.

$$m_x(x, y) = \sum_u \sum_v M_x(u, v) B(x, y, u, v)$$

$$m_y(x, y) = \sum_u \sum_v M_y(u, v) B(x, y, u, v)$$

-continued and $$M_x(u, v) = \Psi\{m_x(x, y)\}$$
$$M_y(u, v) = \Psi\{m_y(x, y)\}$$

Here B denotes the basis function; $M_x$ and $M_y$, represent the transformed motion vectors. The transform function $\Psi\{\cdot\}$ can be DFT (Discrete Fourier Transform), Haar transform, KL transform, wavelet tranform, or others. The indices u and v indicate the basis functions included. Suppose u and v are chosen from the sets U and V (i.e., u∈U and v∈V). The complexity (or number of parameters) can be represented by $|U|\cdot|V|$ where $|\cdot|$ is the number of elements (or cardinality) of the set. The elements in U and V can be customized to include some basis functions whose span is our interested motion subspace. Next we address two types of basis functions: the Fourier family and wavelet family.

Fourier transform and its relatives have been used for many applications, including image coding. Similar to the way they are used in image coding, their basis functions can also be applied to describe the motion field. We can use DFT (Discrete Fourier Transform), DCT (Discrete Cosine Transform), or DST (Discrete Sine Transform) as the motion transform. The basis functions will have the following forms.

$$DFT: B(x, y, u, v) = \exp\left(j \cdot 2\pi\left(\frac{u \cdot x}{M} + \frac{v \cdot y}{N}\right)\right)$$

$$DCT: B(x, y, u, v) = \cos\left(\pi \cdot u \cdot \frac{x+0.5}{M}\right)\cos\left(\pi \cdot v \cdot \frac{y+0.5}{N}\right)$$

$$DST: B(x, y, u, v) = \sin\left(\pi \cdot u \cdot \frac{x}{M}\right)\sin\left(\pi \cdot u \cdot \frac{y}{N}\right)$$

where M and N are the horizontal and vertical size of the frame, respectively.

Wavelet functions can be used to describe the warping in a similar way as the Fourier family (or sinusoidal functions). The main difference is that wavelet transform is usually hierarchically applied thereby bearing the multi-resolution concept. Denote the scaling and wavelet function as $\phi$ and $\varphi$ for generating the multi-resolution analysis (MRA) in the wavelet representation, the motion transform can be written as:

$$m_x(x, y) = \sum_l \sum_{u_l} \sum_{v_l} M_{x,l}(u_l, v_l) B_l(x, y, u_l, v_l)$$

$$m_y(x, y) = \sum_l \sum_{u_l} \sum_{v_l} M_{y,l}(u_l, v_l) B_l(x, y, u_l, v_l)$$

where l is the index for the resolution level, $l=-1, 0, \ldots, L-1$. Note that the basis functions included at each level may vary therefore u and v become a function of l.

In orthogonal wavelet family, the basis functions can be written as a tensor product of the scaling function $\phi$ and wavelet function $\varphi$. At the coarsest level, (i.e., $l=-1$)

$$B_{-1}(x,y,u_{-1},v_{-1})=\phi(x-u_{-1})\phi(y-v_{-1})$$

At finer levels (i.e. $l\geq 0$), the basis functions have three forms: horizontal (H), vertical (V), and diagonal (D) depending on the construct from the scaling and wavelet functions.

$$B_l^H(x,y,u_l,v_l)=\varphi(2^l x-u_l)\phi(2^l y-v_l)$$

$$B_l^V(x,y,u_l,v_l)=\phi(2^l x-u_l)\varphi(2^l y-v_l)$$

$$B_l^D(x,y,u_l,v_l)=\varphi(2^l x-u_l)\varphi(2^l y-v_l)$$

$$\phi(x) = \frac{1}{6}\sum_{j=0}^{4}\binom{4}{j}(-1)^j(x-j)_+^3$$

One example of wavelets is the Cai-Wang wavelet [13,14], in which where for any real number n
and $$x_+^n = \begin{cases} x^n & \text{if } x \geq 0 \\ 0 & \text{otherwise} \end{cases}$$

$$\varphi(x) = -\frac{3}{7}\phi(2x) + \frac{12}{7}\phi(2x-1) - \frac{3}{7}\phi(2x-2)$$

Wavelets and their applications have been very popular recently. Other popular wavelet functions are Haar, Daubechies family, Meyer, Lemarie, and a lot more. For more details, please refer to [15].

Look-up table (LUT) is a direct way to describe the coordinate mapping by simply storing the mapping of every image pixel (grid point) in a table so that a simple table look-up gives the mapped location. Since the movement of each pixel has two degree of freedom, in the non-separable case, a table of size 2 MN is needed to specify the mapping for an M by N image. In the separable case, two arrays (of size M and N each) are sufficient. A LUT can also store only the mapping of a subset of image points to define a mesh structure and be used with different warping functions for each mesh element. They will be further discussed in a later section.

To apply the warping to a video, the warping function can change through time slowly to provide a better protection against pirates' attack. The change must be slow enough so that it does not produce unpleasant visual artifacts. As we have seen that the parameter set itself can be a function of time, $\Theta(t)$, or $$\Theta(t)=f_t(\Theta_0,t)$$

where $\Theta_0$ is the initial parameter set.

Figure 15:
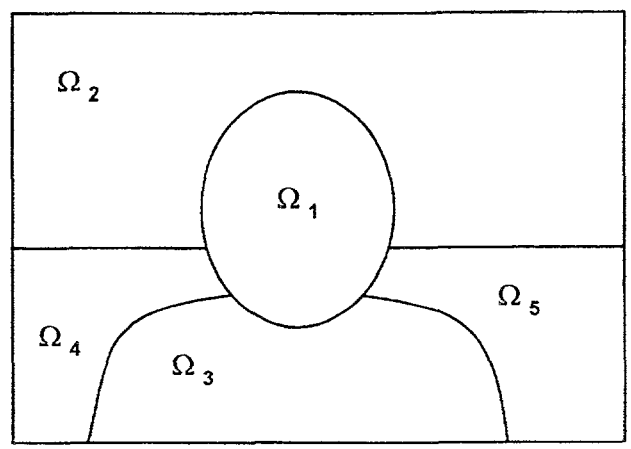
FIG. 15 represents a partition of an image frame, with each partition warped by a different function.

Similar to the way that the spatial warping is applied, the time-warping function $f_t$ can be either linear, quadratic, cubic, or sinusoidal. Most functions shown in Table 15 can be used for time warping as well. Therefore $f_t$ can be: (c.f. FIG. 15)

Piecewise constant: In this case, the parameter set remains constant within a time interval.

Piecewise linear: A saw-tooth-like waveform can be used as the time warping function. Each line segment can be defined by its end points and slope.

Quadratic or cubic curve: Same quadratic or cubic curves can be used in the time domain to specify the parameter change through time.

Sinusoidal: Use of sinusoidal function to describe parameter change though time is relatively simple and it does not require a large number of extra parameters. For example, we can specify the i-th parameter $\Theta_i$ to have the following form:

$$\Theta_i(t)=\Theta_i(t_0)+A\cdot\sin(w(t-t_0))$$

where $\Theta_n$ ($t_0$) is its value at time $t_0$, A and w are the amplitude and angular velocity of the sinusoidal function respectively.

For a long sequence, the form of the time-warping function can be changed at selected time instants, preferably at scene change along the video sequence or black frames, which provides a natural way to insert discontinuity into the time-warping function without causing visual artifacts.

For a more complicated implementation, the warping on a single image can be a result from applying multiple transformations. There are two major ways to apply multiple transformations to an image. One is to apply different warping functions sequentially to the whole or partial image. Suppose a sequence of N warping functions is applied. Then we have:

$$(x',y')=f_1(f_2(\ldots f_N(x,y)))\forall x,y$$

Figure 16:
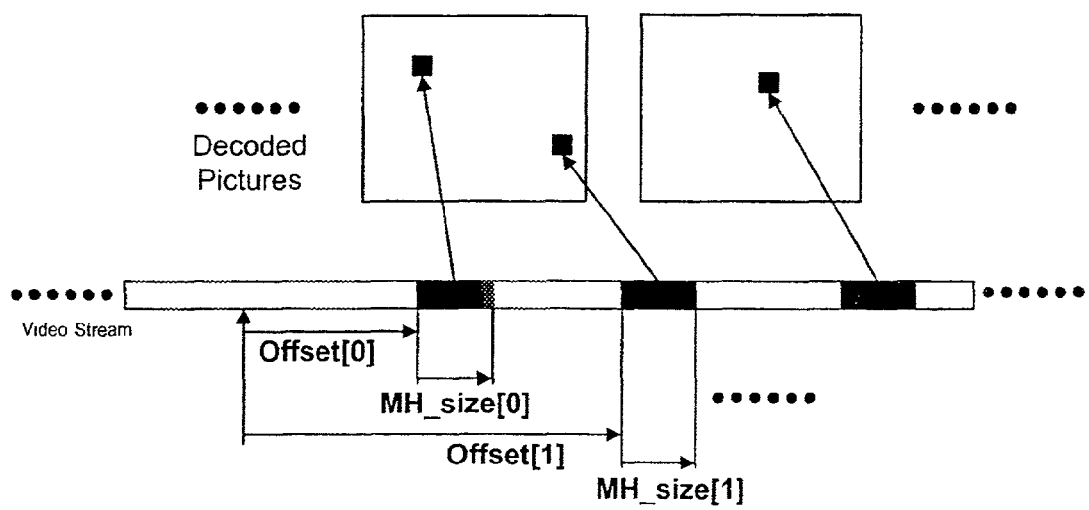
FIG. 16 shows message holes in a video stream.

The other approach is to first partition the image and apply different warping functions to $$\forall (x,y)\in \Omega_i$$

each partition. Therefore, $$(x',y')=f^i(x,y)$$

where $\Omega_i$ is the i-th partition of the image (c.f. FIG. 16). In this case, how to partition the image is critical to the overall distortion and one should be careful not to cause undesired visual effect by ill choosing the partition, function form, and parameter set. Usually, a mesh-like partition can be more easily applied to create the warping, for example, by polygon mesh or non-linear (higher-order) warping on each mesh element.

Figure 7:
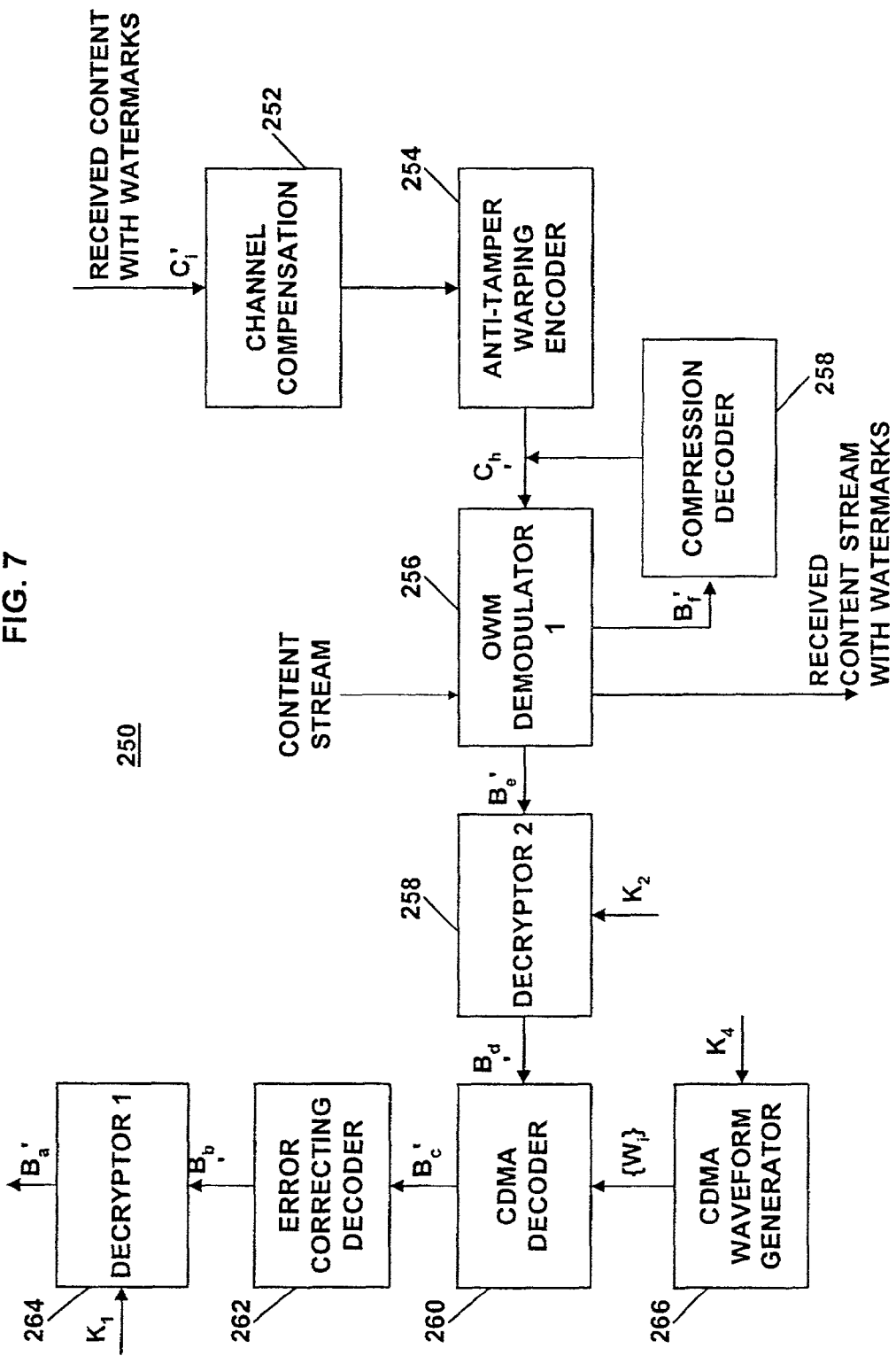

FIGS. 6 and 7 depict, respectively, a system for inserting a watermark into and extracting the water mark from the encrypted and compressed video stream, including warping and re-registration.

In FIG. 6, the original message $B_a$, obtained from a DVD, in this example, by the playback unit is encrypted by unit 202. This unit obfuscates the original message to help prevent insertion of a false but valid watermark message and the retrieval of a watermark message by any unauthorized party. Any one of various encryption algorithms can be used.

The encrypted message is applied to an error correction coder 204 that improves the ability to recover the message even the presence of significant signal degradation and many bit errors by introducing redundant information. Since signal degradation may be severe, especially in the case of a concerted attempt to eradicate the message, strong error correction with a great deal of redundancy is preferred. Reed-Solomon coding combined with convolutional coding is preferred.

The error corrected message next is applied to CDMA encoder 206 that maps (transforms) a single message bit into many bits (a chip or spreading waveform), which dramatically increases the spectrum (bandwidth) of the signal representing the message. Consequently, the density of the power spectra of the signal is greatly reduced so that the signal is more easily hidden and less easily eradicated. Expressed less precisely, the signal is spread over a greater part of the content but is inserted at a lower strength which results in it being harder to notice and harder to remove without degrading most of the content. In the best mode, a table of spreading waveforms is maintained so that it is possible to use different waveforms for different bits that are inserted into the content.

Another (optional) encrypter 212 encrypts the CDMA bitstream. The output of encrypter 212 is supplied to a first watermark modulator 214 that converts each bit into a modification to the content to yield the watermarked content. For example, a few of the frequency components of a signal might be modified by a small random amount in order to represent a single bit. The content is compressed at this point.

Compression decoder 216 decompresses the content, if necessary. If the original content is compressed, it must be decompressed at some point in order to present it to the user. This decoder (e.g., an MPEG-2 decoder) is not part of the watermarking system, but is depicted in the block diagram because it interacts with the watermarking system.

Watermark modulator 218 converts each bit into a modification to the uncompressed content to yield the watermarked content ($C_h$). The block represents an alternate or additional point at which a watermark can be introduced into the content.

Anti-tampering encoder 220 applies any one of a set of geometric transformations, as described previously, that may change over time to the uncompressed image or video in order to make the watermark more difficult to detect or remove.

The watermark extractor 250, shown in FIG. 7, first carries out channel compensation in unit 252, to compensate for the effects of content degradation resulting from, e.g., analog copying or an intentional attempt to remove the watermark. This compensation could be implemented, for example, as a filter that has a transfer function which is the inverse of the transfer function of the degradation.

This is followed by decoding of the mapping function in unit 254, to restore image alignment. Decoding reverses the effect of the anti-tampering warping encoder of a watermark inserter by applying a geometric transformation that is the inverse of the one used by the encoder.

If the content from which the watermark is to be extracted is compressed, it must be decompressed. Compression decoder 254 decompresses the content, if necessary.

Watermark demodulator 256 retrieves each bit embedded in the watermarked content by detecting the modification introduced by the modulator. Decryptor 258 decrypts the retrieved bit stream to reverse the effect of encryptor 212.

CDMA waveform generator 266 duplicates the function of CDMA waveform generator of the watermark inserter 200 by re-creating the spreading waveforms used in the inserter. CDMA decoder 260 inverts the effect of the CDMA encoder by mapping an entire spreading waveform back to a single bit. This mapping is accomplished by computing the correlation between the retrieved waveform and a waveform the possibly could have been used by the watermark inserter. The waveform with the largest correlation value is considered to by the correct one, that is, the one that was used by the inserter.

Error correcting decoder 262 corrects errors in the bits obtained from the CDMA decoder 260. If strong error correction with a large amount of redundancy is used, it is possible to recover the correct bits even in the presence of severe signal degradation. Decryptor 264 decrypts the retrieved bitstream to reverse the effect of decryptor 202. The resultant bitstream should be identical to the original bitstream.

Figure 3:
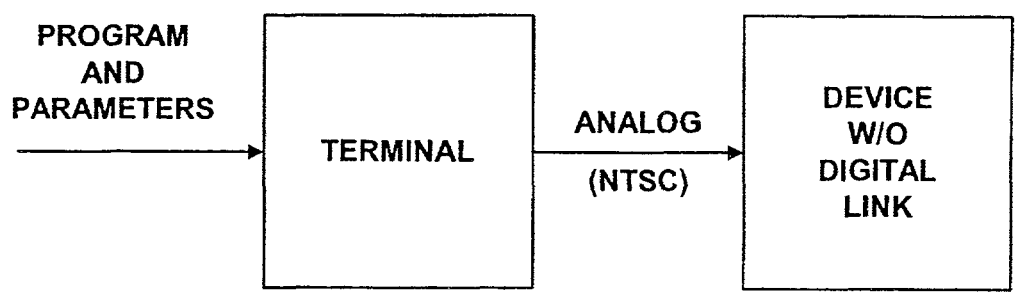
FIG. 3 shows the user terminal interconnected with a device in which there is no digital link, for describing an aspect of the invention.

Referring now to FIG. 3, in accordance with another aspect of the invention, watermark data, software, and other information content, may be downloaded from a service provider to the terminal by embedding the content in the analog channel of the video supplied by the provider. Conventionally, this type of information is supplied by downloading digitally, whereas the invention addresses environments in which the user does not have a digital link. Information may be supplied to the terminal over any medium, including the interne. The content being downloaded might include software, updates or modifications of terminal resident operating software, such as decryption keys, etc., without limitation. In accordance with the invention, the video signal, in the analog domain, such as NTSC, is encoded with data to be downloaded, in the active parts of the audio/video signal channel. By "active" part of the channel is meant the part of the channel that is visible to the user. By contrast, the non-active part of the channel is the part that is not visible, such as within the retrace or blanking interval, or the region of the image outside the screen viewing area.

The NTSC analog signal has a 6 MHz bandwidth channel within which this content to be downloaded to the user can be carried. The data may be embedded in the video in "message holes" as described in the copending application or in any other manner. Although the downloaded content will distort the image or audio perceived by the user, the period of distortion will be limited, and advantageously may be downloaded at a time when the user is not occupying the terminal, such as in the middle of the night. Even where the data is to be downloaded when the terminal is otherwise in use, the television or other equipment may be temporarily disabled or "blanked" or overlaid with a "downloading in process" message, to avoid confusing or annoying the user.

Although information has been downloaded in the past with the NTSC analog signal, only a very limited amount of data has been embedded into the non-active portion of the audio/video signal. However, the present invention capitalizes on the fact that the active region is many times greater in bandwidth capacity than the non-active portion of the channel.

Downloading per the invention is not limited to any particular standard, for example, PAM or other modulation format can be implemented. Furthermore, the downloaded content may be encrypted, compressed, etc.

Because the terminal may not have any handshaking capability with the content provider, the preferred embodiment implements local error checking, utilizing any suitable error checking algorithm. Error correction preferably also is implemented locally since there is no ability to request resending of error laden data.

Figure 8:
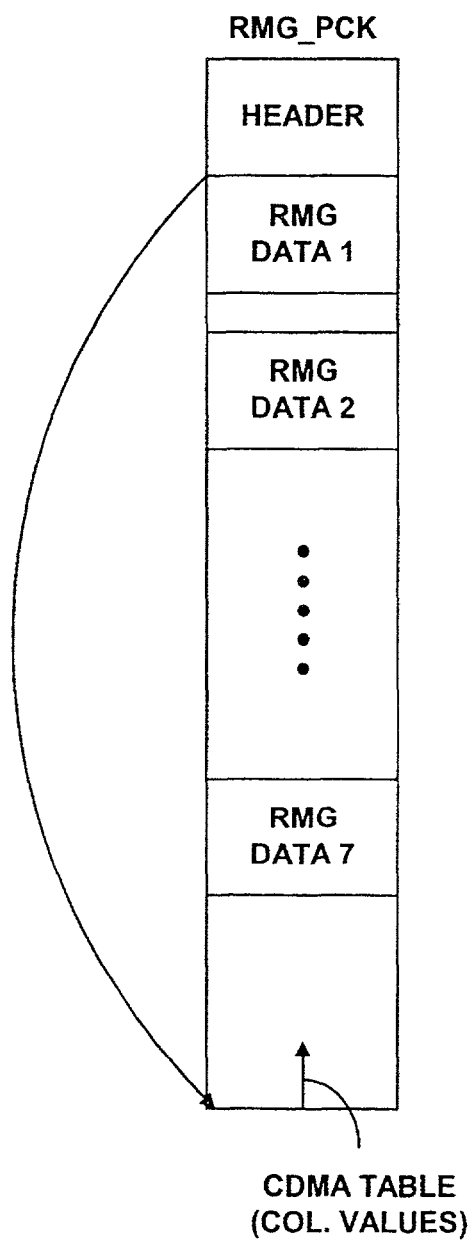
FIG. 8 is a diagram of the data structure of a RMG_PCK used for carrying CDMA table data, in accord with another aspect of the invention.

Referring now to FIG. 8, in accord with another aspect of the invention, an improvement is made to the copending application in which a substantial amount of local storage is required for storing the reference CDMA waveform values for correlation with the waveforms received from and bearing watermark information associated with, the playback units. FIG. 8 of the copending application, and associated written disclosure, incorporated herein by reference, summarizes the CDMA encoding process, with column-by-column permutations of the waveform exclusive ORed with the bitstream to produce an output bitstream bearing the watermark content, in scrambled order. In accord with this invention, rather than storing the CDMA waveform values locally, the CDMA values are carried, column by column, in the running mark pack (RMG_PCK), such as at the bottom of the pack, and building upward, as shown in FIG. 8. Alternatively, storage of the columns can be made serially downward in the pack, in a conventional way.

Figure 9:
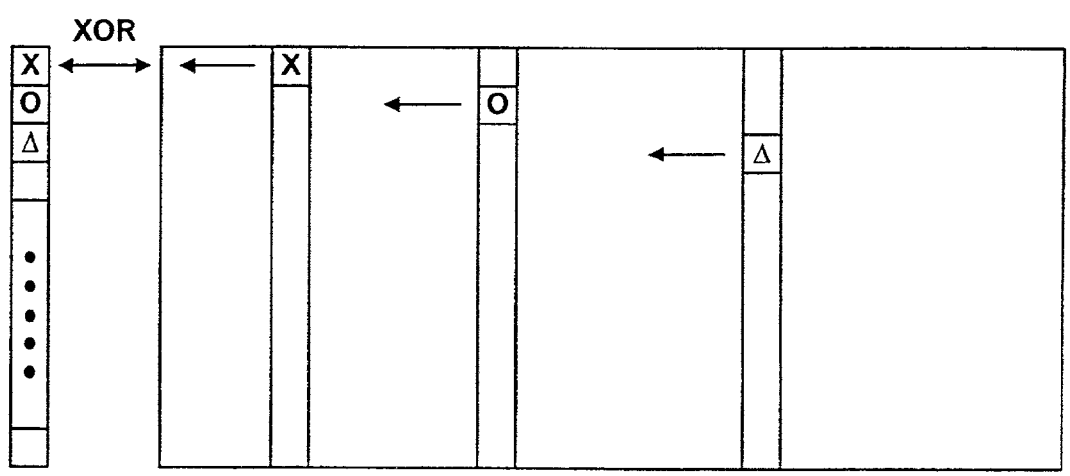
FIG. 9 is a diagram showing processing of column data carried by the RMG_PCK, in the invention.

As an enhancement to this CDMA storage methodology, referring to FIG. 9, bits of different columns of the table can be selected to comprise a "single column" for exclusive OR bitwise processing.

Preferably, two columns of the CDMA waveform table are sent in each RMG_PCK, although the number can be varied. An advantage of this methodology is in enhanced security, as the entire CDMA table is not available, in one location, for reverse engineering by a pirate. Furthermore, the described methodology provides enhanced flexibility, as different columns can be implemented for embedding in the RMG_PCK, and are changeable.

Figure 10:
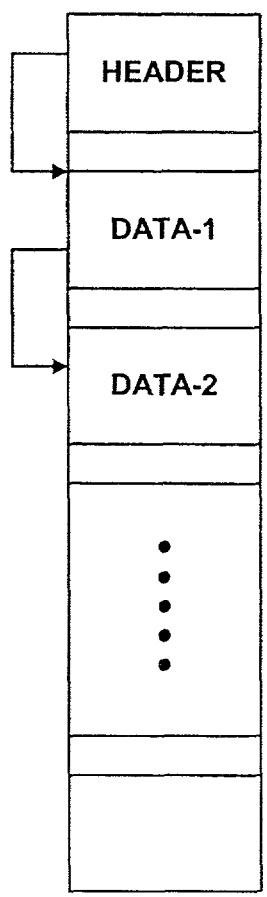
FIG. 10 shows an expandable MPEG-2 compatible bitstream packet, in accordance with a further aspect of the invention.
Figure 11:
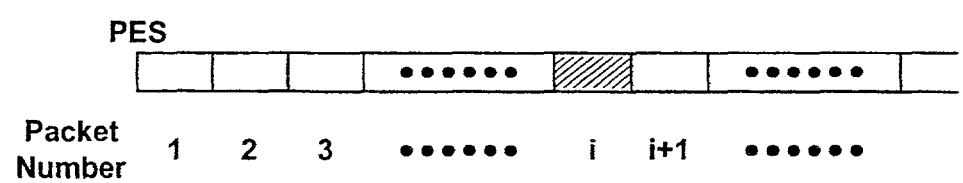
FIG. 11 shows packet identification using packet signatures per another aspect of the invention.
Figure 14:
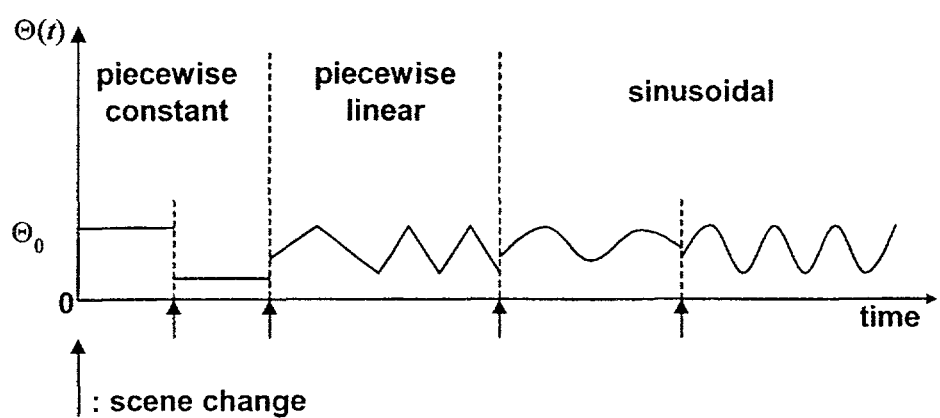
FIG. 14 shows different types of time warping functions applied to video.

Another aspect of the invention, shown in FIG. 10, is in an improvement to the RMG_PCK data structure described in FIG. 14, and associated text, of the copending application. The layout of the structure comprises a running mark header, followed by a number of data, within an MPEG bitstream. In accord with this improvement, unused regions are reserved between the header and first data and between the successive data, that, together, conform to DVD specifications. The data structure hence is expandable, using the reserved areas, such that additional programming such as watermark, encryption, etc., can be added.

Copy protection watermarking cannot provide comprehensive protection of content. It only prevents the copying of content by a compliant recorder. There are numerous non-compliant recorders in the world, including all of the many millions of VCRs that have been sold to date, which will freely copy content containing a "never copy" watermark. For these non-compliant recorders, the Macrovision analog protection system (APS) may discourage casual copying on some machines, but many modern VCRs have no difficulty recording video signals containing APS and inexpensive devices that defeat APS are available to the public at the local electronics store. Furthermore, APS cannot protect the RGB video signals commonly used on computers or the digital video signals on, for instance, a USB or 1394 link. Additional protection can be afforded to content by using tracing watermarks, which do not prevent copying, but can be used to identify those who make illegal copies. Tracing watermarks are retrieved by a content provider or service provider and, consequently, a compliant recorder is not required to enable tracing. Consumer electronics devices do not need to detect these watermarks at all. Some consumer electronics devices, like the OPIMA terminal, would need to insert the tracing watermarks into content.

If one surveys current watermarking techniques, the idea of a consumer electronics device inserting watermarks into video in real-time appears impractical at first because of the complexity involved and the large amount of computation required. These techniques commonly perform video scene analysis, compute frequency transforms (e.g., the DCT, FFT, or wavelet transform) on large parts of the video, and invoke models of human perception. In addition, most techniques operate on uncompressed video whereas most consumer electronics devices receive compressed video (e.g., an MPEG bitstream). A few watermarking techniques operate on an MPEG bitstream by modifying the coefficients of the 8×8 DCT blocks [3,4]. In this case, the VLCs (Huffman codes) are decoded, inverse quantization is performed to get the DCT coefficients, the DCT coefficients are modified to introduce the watermarks, the modified coefficients are quantized, and replacement VLCs are generated by Huffman encoding the DCT coefficients. The complexity and computation required to do all this in real-time is substantial. A more realistic alternative is to insert watermarks by replacing sections of the MPEG bitstream with alternate sections of bitstream.

Suppose that a watermark can be introduced into a video so that only some sections of the MPEG bitstream for the watermarked video are different from the bitstream for the unwatermarked video. For instance, if one bit of the watermark is represented by modifying the coefficients of a single 8×8 DCT block and the number of bits comprising the watermark is much less than the number of DCT blocks in the video, the watermarked and unwatermarked bitstreams would be the same except for those MPEG picture slices that contain a modified DCT block. For brevity and clarity in the discussion that follows, a section of the watermarked MPEG bitstream that differs from the unwatermarked bitstream will be referred to as a message hole (MH). (FIG. 16) In this example, the coefficients of the DCT block would be modified one way to embed a 0 bit into the watermarked bitstream and would be modified some other way to embed a 1 bit. In other words, for this message hole, there would be two alternative sections of bitstream; one represents a 0 and the other represents a 1. If both alternative sections of bitstream are available, either bit value (0 or 1) can be inserted into the message hole by to inserting the appropriate section of bitstream. Any desired number of bits, any one of which can be 0 or 1, can be inserted into the watermarked bitstream this way so that a message (e.g., a tracing message containing a user ID) can be hidden in the video. All that is needed is a sufficient number of message holes and the alternative sections of bitstream for each one.

This approach to watermarking imposes a constraint: the alternative sections of bitstream associated with a message hole must be the same size (contain the same number of bits). Otherwise, the size of the overall bitstream would change depending on the message that was inserted. Decoder buffer underflows or overflows could occur. This constraint is satisfied by adaptively encoding or re-encoding the alternative portions of the video to obtain same-sized sections of bitstream. Recall the previous example, where the coefficients of a DCT block are modified to represent a bit. There would be two alternative bitstreams for the MPEG picture slice containing the block, depending on whether the bit is a 0 or a 1. One of these alternative slices can be encoded with different quantization levels until its size is as near as possible to the size of the other slice without being larger. Bit stuffing is then added to make the two slices exactly the same size. Either slice then can be inserted into the MPEG bitstream without affecting the decoder buffering.

The burden imposed on the OPIMA terminal (or similar device) can be reduced dramatically if much of the computation associated with watermarking is performed off-line before the MPEG bitstream is transmitted to the terminal. Everything, including watermarking and the adaptive encoding described in the preceding paragraph, can be done off-line except the final replacement of sections of bitstream with alternative sections of bitstream. To represent the tracing watermark message, the OPIMA terminal would need only to replace the appropriate sections of bitstream. This approach is simple and inexpensive to implement in the terminal, but requires that all the alternative sections of bitstream be transmitted to the terminal. These sections of bitstream can be transmitted in some auxiliary data stream, such as a private data stream. If the amount of the bitstream that is replaced is small, the overhead is small. An advantage of this approach is that future improvements to the watermarking algorithms do not affect the terminal so long as the watermarks can be inserted by replacing sections of bitstream.

A variation on this technique attempts to reduce the overhead information that needs to be sent, but imposes a greater burden on the OPIMA terminal. In one example of such a tradeoff, the quantization level that keeps the same number of bits in a slice is computed off-line before the video is transmitted to the terminal. Instead of sending the alternative sections of bitstream via an auxiliary data stream, the alternative sections are created by the terminal using the quantization levels that were computed off-line. If needed, other information that describes how the alternative section of bitstream should be created can be computed off-line and sent to the terminal too. While the computational burden placed on the terminal is increased, the overhead associated with transmitting the quantization levels and other information describing how the alternative sections of bitstream are created should be less than the overhead of sending all the alternative sections of bitstream.

A packetized elementary stream (PES) of MPEG2 is composed by a sequence of PES packets, all of whose payloads consist of data from a single elementary stream, and all of which have the same stream_id [6]. An elementary stream is a generic term for one of the coded video, coded audio or other coded bit streams. The problem of packet searching is to search for a particular packet along the bit stream, given the target packet's information. If each packet is associated with a unique, sequentially labeled packet number in its header, then the packet searching can be as simple as matching the unique packet number directly using a sequential search.

In general, however, the packet number may not exist in the header. One solution for that is to count the number of packets from the beginning of the stream until the current count matches with the target's packet number, assuming we know the i-th packet is our target. Obviously, this scheme is not robust because any packet loss between the beginning of the stream to the location of the target packet will cause picking up a wrong packet since the count becomes incorrect right after the packet loss. Another method to remedy the lack of packet number is to add the packet number into the header such as using the field of private data. The required bits for the packet numbers will increase the overhead. The insertion of packet numbers to packets is quite simple if it is performed during or before multiplexing of different MPEG streams to form the PES. However, for some situations, if only PES is available, a careful examination of the buffer overflow problem is required because of the extra bits for packet numbers. A significant processing effort may be needed for de-multiplexing and multiplexing the PES, and buffer control. An alternative method for handling PES without packet number is to match packets using signatures which are composed from some information of packets. A signature should be a unique feature for one or more packets that there is no ambiguity in the matching process. There are many ways to create a signature. Obviously, if there is packet number in a packet, it can be used as a signature for matching. Three other approaches are described in the following.

One approach is to use the combination of stream_id and presentation time-stamp (PTS) of a packet header [6]. The stream-id is an 8-bit field which specifies the type and number of the elementary streams and may take values in the range '1011 1100' to '1111 1111'. Since the first bit of stream-id is always '1', only last 7 bits are used for the signature. On the other hand, the PTS is a 33-bit number coded in three separate fields. It indicates the intended time of presentation in the system target decoder of the presentation unit that corresponds to the first access unit that commences in the packet. It is used to synchronize the presentation of multiple elementary streams, such as a coded video stream and the corresponding coded auditory streams. Since the PTS has a sequential order for each packet type along the PES, the searching of target packet can be stopped or reversed if it passes the target signature. Since all packet stream_ids for an elementary stream are the same and different packets of different elementary streams may have the same PTS, a packet can not be specified uniquely by using either stream_id or PTS. However, a combination of stream_id and PTS can distinguish a specific packet.

Since PTS does not always exist in a packet header, not all the packets will have a signature in this case. To solve this problem, relative location can be used. In this scheme, an offset relative to a reference (absolute) location which has an unique signature is used to specify the target packet for matching. The search starts from matching the signature of the reference packet. Once it is found, we simply count the subsequent packets until the offset address is reached. For robustness, the offset should not be a big number, i.e. the distance between packet to be specified to the relative packet should not be far away. It implies that the number of bits to specify a relative location is, in general, smaller than that of absolute location and the overhead for packet locations is reduced. This is also true for that the packets have packet numbers.

Figure 17:
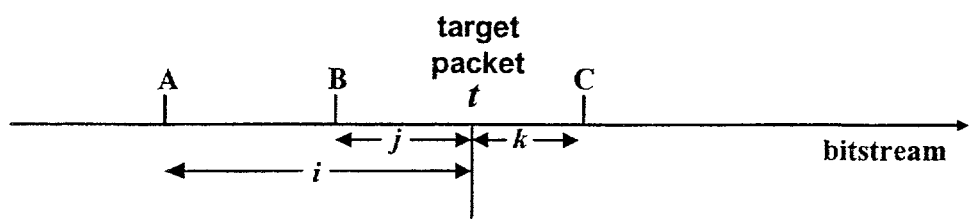
FIG. 17 shows the use of reference packets and offset information to search for the target packet.

A mismatch will happen for using relative relation to specify a packet when there is packet loss between the reference packet and the target packet. To solve this problem, multiple reference packets can be used for cross-verification so that a mismatch can happen only when a packet loss exists between all reference location and the target location. In FIG. 17, A, B, and C are potential reference packets. The target packet's location loc(t)=loc(A)+offset(A)=loc(B)+offset (B)=loc(C)+offset(C). In this figure, offset(A)=+i, offset(B)= +j, and offset(C)=–k. The target packet can be located using single or multiple reference packets. A packet loss before loc(A) or after loc(C) will not cause any mismatch during the search of target t in this example. A packet loss between loc(A) and loc(B) will cause a mismatch only if A is chosen as the only reference packet.

The second approach of creating a signature is to use lower-layer information within compressed stream that is apparently unique and therefore does not cause ambiguity. Examples of such lower-layer information are frame number and time code. Though they seem convenient to use, the drawback of using lower-layer information is that the stream has to be decoded to the desired layer in order to extract such lower-layer. The computation is much higher that that for high-layer signatures such as using stream_id and PTS in the packet header.

Figure 18:
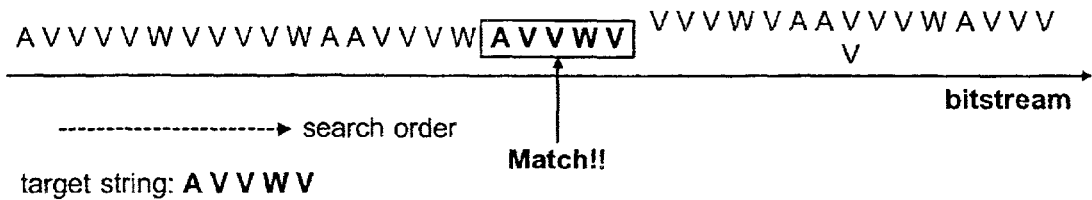
FIG. 18 shows the use of group signatures (patterns) and string matching to search for a particular packet.

The third approach of forming a signature is to use information of multiple packets. For example, a sequence of multiple stream_id's from consecutive packets can form a signature. To search for the target packet based on the group of fields, a string matching algorithm (or elastic matching to cope with packet loss) can be used. The idea is illustrated in FIG. 18 for using five stream_ids. The approach may save some signature overhead. For example, concatenating a 33-bit PTS with a 7-bit stream_id as a signature requires total 40 bits. (The first bit of stream-id is always 1 and therefore it can be skipped.) On the other hand, using five or fewer 7-bit stream_ids only requires 35 or less bits. See FIG. 18

Currently, this proposal focuses on using absolute and relative locations to specify packet locations. For absolute location, the approach of using packet numbers and that using stream_id with PTS are used for signature matching. For relative location, the offset to the previous closet absolute location is used. To avoid searching forever because of a packet loss or a signature miss, two absolute locations within a OWM_PCK are used and the packet searching process is refreshed if a new OWM_PCK is met.

An open watermark (OWM) stream is a packetized elementary stream which contains the data for replacing the compressed content stream (s) and the processing parameters. Its packets are called OWM_PCKs. They are encoded as a private_stream_1, i.e. the stream_id equals to "1011 1101b" as described in page 30 of MPEG-2 Part 1 specification. To distinguish other non-watermark applications using private_stream_1, a sub_stream_id is introduced as the first PES_packet_data_byte and its value for OWM equals to "1111 1111b".

A OWM_PCK is stored physically before any content packets which contain message holes to be modified by that OWM_PCK. A OWM_PCK consists of a OWM_header, multiple OWM_data and other watermark processing information. A OWN_data_is used for one replacement. Only one message hold is processed for one watermarking. The syntax of the OWM_PCK, OWM_data and other watermark stream information are described in tables 16-20. The OWM_PCK header provides global information about watermark replacement algorithms and parameters used by all watermarkings within the OWM_PCK. The num_OWM_data is the total number watermarks in the OWM_PCK. Each watermark uses one OWM_data. The bit_index points to the first bit to be sent for this OWM_PCK in the bit array $B_e$ which is the input of WM modulator in FIG. 6. When a watermarking is finished, the bit_index is update for the next watermarking according to the following formula.

$$bit\_index = bit\_index + bit\_index\_incr.$$

For a new OWM_PCK, the bit_index is used to resynchronize the bit to be sent. Let $n_r$ be the number of bits to be sent for a watermarking, and Num_replacements be the total number bitstreams in a OWM_data to be used for replacing a message hole. If the first replacement is put into the MH of compressed content stream, the flag first_replacment_in_MH equals to 1 and Num_replacements=$2^{n_r}$–1, otherwise, the flag first_replacment_in_MH equals to 0 and Num_replacements=$2^{n_r}$. Note that the number of replacement bitstreams for all OWM_data in an OWM_PCK do not change in order to reduce the overhead of the OWM_data.

For a watermarking, the size of a message hole is determined by the MH_size. If the size of all message holes in the OWM_PCK do not change, the flag MH_size_flag in the OWM_header is set to 0, and only one MH_size exists in the OWM header. Otherwise, each OWM_data contains a MH_size. The location of the message hole in a content packet is determined by its packet location and the MH_location_offset. As described earlier, the packet location is specified by either absolute location or relative location. The MH_location_offset specifies the number of bytes between the message hold and the first byte after the PES_packet_length field. The first OWM_data and the next_OWM_data_offset are used to jump directly to the first and next OWM_data in a OWM_PCK respectively. They are the offsets in bytes from the first byte after the PES_packet_length field to that OWM_data. For the last OWM_data, next_OWM_data_offset is set to zeo. Future data can be put at the end of each OWM_data. To have a better implementation for run-time processing of watermarking, a few columns of CDMA waveform table may be stored inside the OWM_header. It also provides a way to support more flexible CDMA coding since the CDMA waveforms can be changed for different OWM_PCKs. The flag CDMA_columns_flag controls whether or not there are CDMA columns.

Figure 19:
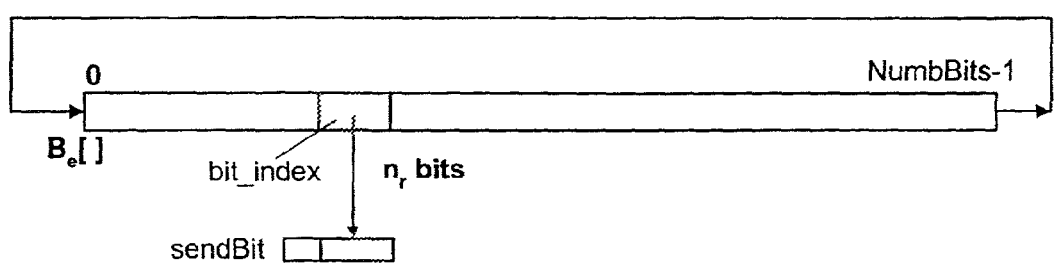
FIG. 19 shows bits being extracted to be sent from $B_e[\ ]$.

There are many different methods for performing the watermarking replacements which are selected within the routine MH_replacement_method ( ). Among these methods, the routine simple_replacement_method( ) performs simple ways of replacing MH bits according to the variable Mode. For the case of Mode=0, the MH bits are replaced by b[0]. For the cases of Mode=1 or 2, a sendBit is formed by extracting $n_r$ bits from input bit array which is an input of watermark modulator pointed by bit_index. For the case of Mode=1, the MH bits are replaced by b[sendbit-1] if the first replacement is in the MH. Otherwise, the MHs are replaced by b[sendbit]. For the case of version=2, the $n_r$ least significant bits of sendbit are reversed, e.g. "0000 0101" becomes "0000 0010"

for $n_r$=3. Then the MH bits are replaced by b[sendbit-1] if the first replacement is in the MH. Otherwise, the MHs are replaced by b[sendbit]. If the Mode value is not on the list, no replacement is performed. See FIG. 19.

TABLE 16

| Syntax | No. of bits | Mnemonic |
|---|---|---|
| OWM_PCK( ) { | | |
|   packet_start_code_prefix | 24 | bslbf |
|   stream_id | 8 | uimsbf |
|   PES_packet_length | 16 | uimsbf |
|   sub_stream_id | 8 | uimsbf |
|   if (sub_stream_id == '1111 1111') { | | |
|     new_OWM_system_header_flag | | |
|     if ( new_OWM_system_header_flag == 1 ) | | |
|       OWM_system_header ( ) | | |
|     OWM_header ( ); | | |
|     for ( i = 0; i < num_OWM_data; i++) | | |
|       OWM_data ( ) | | |
|   } | | |
| } | | |

TABLE 17

| Syntax | No. of bits | Mnemonic |
|---|---|---|
| OWM_system_header( ){ | | |
|   TBD | | |
| } | | |

TABLE 18

| Syntax | No. of bits | Mnemonic |
|---|---|---|
| OWM_header( ){ | | |
|   bit_index | | |
|   num_OWM_data | | |
|   $n_r$ | | |
|   first_replacement_in_MH_flag | | |
|   NBits_packet_location_offset | | |
|   NBits_MH_location_offset | | |
|   NBits_bit_index_incr | | |
|   first_OWM_data_offset | | |
|   MH_size_flag | | |
|   if (MH_size_flag == 0) | | |
|     MH_size | | |
|   MH_replacement_method ( ) | | |
|   CDMA_columns_flag | | |
|   if ( CDMA_columns_flag == 1 ){ | | |
|     num_CDMA_columns | | |
|     for ( i = 0; i < num_CDMA_columns; i++) { | | |
|       CDMA_column_incr | | |
|       for ( j = 0; j < NRows CDMA; j++) | | |
|         CDMA_column_data | | |
|     } | | |
|   } | | |
| } | | |

TABLE 19

| Syntax | No. of bits | Mnemonic |
|---|---|---|
| OWM_data( ){ | | |
|   next_OWM_data_offset | | |
|   if (MH_size_flag ==1) | | |
|     MH_size | | |
|   absolute_packet_location_flag | | |
|   if (absolute_packet_location_flag ==1 ) | | |

TABLE 19-continued

| Syntax | No. of bits | Mnemonic |
|---|---|---|
|     absolute_packet_location ( ) | | |
|   else | | |
|     packet_location_offset | | |
|   MH_location_offset | | |
|   bit_index_incr    NBits_bit_index_incr | | tcimsbf |
|   for ( i = 0; i < num_replacements; i++){ | | |
|     for ( j = 0; j < MH_size; j++) | | |
|       replacement_bits[i][j] | 8 | bslbf |
|   } | | |
| } | | |

TABLE 20

| Syntax | No. of bits | Mnemonic |
|---|---|---|
| absolute_packet_location ( ){ | | |
|   if ( packet_type == MPEG2_PES) { | | |
|     stream_id[6..0] | 8 | bslbf |
|     PTS [32..0] | 33 | bslbf |
|   } else if (packet_type == have_packet_numbers) { | | |
|     packet_num | 32 | bslbf |
|   } | | |
| } | | | new_OWM_system_header_flag: If new_OWM_system_header_flag=1, new_OWM_system_header is followed for updating OWN system parameters.

bit_index: It points to the first bit to be sent for this OWN_PCK in the bit array Be which is the input of OWM modulator 1 of FIG. 6.

num_OWM_data: Number of WMs in this OWN_PCK.

$n_r$: Number of sending bits for a replacement.

first_replacement_in_MH_flag: If the first replacement is put in the MH of compressed content stream, this flag equals to 1. Otherwise, this flag equals to zero and all replacements are put in the OWM_data.

N_Bits_packet_location_offset: Number of bits for the parameter packet_location_offset.

NBits_MH_location_offset: Number of bits for the parameter MH_location_offset.

NBits_bit_index_incr: Number of bits for the parameter bit_index_incr.

first_OWM_data_offset: Offset in bytes from the beginning of a OWM_PCK to the first OWM_data.

MH_size_flag: If the size of message holes within this OWM_PCK may be different, then this flag equals to 1 and there are MH_size data in the OWM_data. Otherwise, this flag equals to 0 and MH_size data is followed.

MH_replacement_method ( ): Different methods for replacing MH bits in MHs of this OWM_PCK.

CDMA_columns_flag: If the CDMA columns are sent for CDMA process of WM bits in this OWM_PCK, this flag equals to 1 and CDMA data are followed.

num_CDMA_columns: Number of CDMA columns.

CDMA_column_incr: The increment of column number respect to a reference column in CDMA table which is calculated from bit_index.

CDMA_column_data: The CDMA column data.

Void simple_replacement_method(u6 Mode){
  u16 sendbit =0;

-continued

```
locate MH bits of Message Hole using SectorNum and Offset;
switch(Mode) {
case 0: /* Replace MH bits with b[0] */
    replace MH bits with b[0];
    break;
case 1: /* Replace MH bits with b[sendbit-1] */
    extract n_r bits from Be[ ] pointed by bit_index and store them to
sendbit as in
    figure 6.5;
    if( first_replacement_in_MH) {
        if(0< sendbit)
            replace MH bits with b[sendbit-1];
    } else {
        replace MH bits with b[sendbit];
    }
    break;
case 2: /* Replace MH bits with b[reverse(sendbit) -1] */
    extract n_r bits from Be[ ] pointed by bit_index and store them to
sendbit as in
    figure 6.5;
    reverse each one of n_r least significant bits of sendbit;
    if( first_replacement_in_MH) {
        if(0< sendbit)
            replace MH bits with b[sendbit-1];
    } else {
        replace MH bits with b[sendbit];
    }
    break;
case OtherVersions:
    break;
}
} A simple replacement method for a watermarking.
```

REFERENCES

1. I. J. Cox, J. Kilian, T. Leighton, and T. Shamoon, "A secure, robust watermark for multimedia," in *Proc. Workshop on Information Hiding*, Cambridge Univ., U.K., May 30-Jun. 1, 1996, pp. 185-206.
2. B. Schneier, *Applied Cryptography*, $2^{nd}$ ed., New York: John Wiley & Sons, 1996.
3. F. Hartung and B. Girod, "Digital Watermarking of MPEG-2 coded video in the bitstream domain," in *Proc. ICASSP-97*, Munich, Germany, Apr. 21-24, 1997.
4. F. Hartung and B. Girod, "Digital Watermarking of raw and compressed video," *Systems for Video Communication*, pp. 205-213, October 1996.
5. M. D. Swanson, B. Zhu, and A. H. Tewfik, "Multiresolution scene-based video watermarking using perceptual models," *IEEE J. Select. Areas Commun.*, vol. 16, no. 4, pp. 540-550, May 1998.
6. ISO/IEC 13818-2, "Information technology—Generic coding of moving pictures and associated audio information—Part 2: Video," 1995.
7. J. Lubin, "A visual discrimination model for imaging system design and evaluation," David Sarnoff Research Center.
8. B. Girod, "The information theoretical significance of spatial and temporal masking in video signals," *Human Vision, Visual Processing, and Digital Display*, SPIE, vol. 1077, 1989.
9. A. B. Watson, "DCT quantization matrices visually optimized for individual images," NASA Ames Research Center.
10. C. I. Podilchuk and W. Zeng, "Image-adaptive watermarking using visual models," *IEEE J. Select. Areas Commun.*, vol. 16, no. 4, pp. 525-539, May 1998.
11. A. Ahumada and H. Peterson, "Luminance-model-based DCT quantization for color image compression," in *Human Vision, Visual Processing, and Digital Display*, SPIE, 1992.
12. J. D. Foley, A. Van Dam, S. K. Feiner, and J. F. Hughes. *Computer Graphics: Principles and Practice*, $2^{nd}$ Ed., Reading, Ma.: Addison-Wesley, 1990.
13. W. Cai and J. Wang, "Adaptive multiresolution collocation methods for initial boundary value problems of nonlinear PDEs," *SIAM J. Numer. Anal.*, vol. 33, no. 3, pp. 937-970, June 1996.
14. Y.-T. Wu. *Image Registration Using Wavelet-Based Motion Model and Its Applications*. Ph.D. thesis, University of Pittsburgh, 1997.
15. M. Vetterli and J. Kovacevic. *Wavelet and Subband Coding*, Englewood Cliffs, N.J.: Prentice Hall, 1995.
16. S. B. Wicker, *Error Control Systems for Digital Communication and Storage*, Englewood Cliffs, N.J.: Prentice Hall, N.J. 07458, 1995.
17. M. K. Simon, J. K. Omura, R. A. Scholtz, and B. K. Levitt, *Spread Spectrum Communications Handbook*, revised edition, McGraw-Hill, Inc., 1994.

What is claimed is:

1. A playback unit, comprising:
   an input for receiving an encoded data stream bearing a video image;
   a decoder for decoding the encoded data stream; and
   means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
   said warping changes with time during playback of the video image.

2. A playback unit, comprising:
   an input for receiving an encoded data stream bearing a video image;
   a decoder for decoding the encoded data stream; and
   means for imparting a prescribed transformation to the video image for warping the video image in a manner, and by an amount, not readily visible to a viewer such that a composite video image produced by multiple said video playback units will be distorted and the distortion of the composite video image can be seen by the viewer, wherein
   said warping is selected randomly from among a plurality of mapping functions pre-stored in a playback unit.

3. A playback unit, comprising:
   an input for receiving an encoded data stream bearing a video image;
   a decoder for decoding the encoded data stream; and
   means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
   the image is warped by compressing spacing between pixels in one direction and expanding spacing in another direction.

4. A playback unit in accordance with claim 1, wherein said warping changes upon scene change of said video image.

5. A playback unit, comprising:
   an input for receiving an encoded data stream bearing a video image;
   a decoder for decoding the encoded data stream; and
   means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein said warping is defined by a geometric transformation.

6. A playback unit, comprising:
an input for receiving an encoded data stream bearing a video image;
a decoder for decoding the encoded data stream; and
means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
said warping is derived by backward warping of a two-dimensional geometric transformation of said video image.

7. A playback unit, comprising:
an input for receiving an encoded data stream bearing a video image;
a decoder for decoding the encoded data stream; and
means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
said warping is performed by a three-dimensional transformation of said video image.

8. A playback unit, comprising:
an input for receiving an encoded data stream bearing a video image;
a decoder for decoding the encoded data stream; and
means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
said warping is described by a linear function.

9. A playback unit, comprising:
an input for receiving an encoded data stream bearing a video image;
a decoder for decoding the encoded data stream; and
means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
said warping is described by a quadratic function.

10. A playback unit, comprising:
an input for receiving an encoded data stream bearing a video image;
a decoder for decoding the encoded data stream; and
means for imparting a prescribed transformation to the video image for warping the video image in a manner, and by an amount, not readily visible to a viewer such that a composite video image produced by multiple video playback units will be distorted and the distortion of the composite video image can be seen by the viewer, wherein
said warping is described by a spline function.

11. A playback unit, comprising:
an input for receiving an encoded data stream bearing a video image;
a decoder for decoding the encoded data stream;
means for imparting a prescribed transformation to the video image for warping the video image in a manner, and by an amount, not readily visible to a viewer such that a composite video image produced by multiple video playback units will be distorted and the distortion of the composite video image can be seen by the viewer; and
means for applying a motion vector to pixels of said video image for image transformation.

12. A playback unit, comprising:
an input for receiving an encoded data stream bearing a video image;
a decoder for decoding the encoded data stream;
means for imparting a prescribed transformation to the video image for warping the video image in a manner, and by an amount, not readily visible to a viewer such that a composite video image produced by multiple video playback units will be distorted and the distortion of the composite video image can be seen by the viewer; and
means for performing different image transformations in different regions of said video image.

13. A method for processing an audio or video data stream containing digital watermark data, comprising:
utilizing a playback unit for playing out information contained in the audio or video data stream; and
during playing by the playback unit, altering the audio or video information by applying to the audio or video data stream a predetermined mapping function associated with the playback unit to distort the audio or video, wherein
audio or video information produced by combining multiple audio or video data streams corresponding to said information, from different playback units, is distorted and the distortion of the produced audio information can be heard by a listener of the produced audio information or the distortion of the produced video information can be seen by a viewer of the produced video information, and
said video information comprises a video image embedded in a video data stream, and said video image is distorted during playback by a playback unit in accord with the predetermined mapping function by an amount not readily visible to the viewer, but such that a video image produced by combining multiple video data streams reproduced by multiple different playback units is distorted and the distortion can be seen by the viewer.

14. The method in accordance with claim 13 wherein said mapping function changes with time during playback of the video image by a playback unit.

15. The method in accordance with claim 13 wherein said mapping function is selected randomly from among a plurality of mapping functions pre-stored in a playback unit.

16. The method in accordance with claim 15, wherein the image is distorted by the playback unit by compressing spacing between pixels in one direction and expanding spacing in another direction.

17. The method in accordance with claim 13, wherein said mapping function is changed upon scene change of said video image.

18. The method in accordance with claim 17, wherein the mapping function is changed in a first manner within a scene, and is changed in a second manner upon a scene change.

19. The method in accordance with claim 13, wherein said mapping function is defined by a geometric transformation.

20. The method in accordance with claim 19, wherein said mapping function is derived by backward warping of a two-dimensional geometric transformation of said video image.

21. The method in accordance with claim 19, wherein said mapping function is derived by a three-dimensional geometric transformation of said video image.

22. The method in accordance with claim 19, wherein said mapping function is linear.

23. The method in accordance with claim 19, wherein said mapping function is quadratic.

24. The method in accordance with claim 19, wherein said mapping function is a spline function.

25. The method in accordance with claim 19, wherein a motion vector is applied to one or more pixels of said video image for image transformation.

26. The method in accordance with claim 19, wherein the mapping function is obtained from a stored table.

27. The method in accordance with claim 19, wherein the mapping function is obtained from a computed table.

28. The method in accordance with claim 19, wherein different image transformations are performed in different regions of said video image.

* * * * *